US009676650B2

(12) United States Patent
Kariya et al.

(10) Patent No.: US 9,676,650 B2
(45) Date of Patent: Jun. 13, 2017

(54) METHOD AND APPARATUS FOR MAKING GLASS SHEET

(75) Inventors: Hiroyuki Kariya, Yokkaichi (JP); Kimihiko Nakashima, Pyeongtaek-shi (KR)

(73) Assignees: AvanStrate Inc., Mie (JP); AVANSTRATE KOREA INC., Gyeonggi-Do (KR)

( * ) Notice: Subject to any disclaimer, the term of this patent is extended or adjusted under 35 U.S.C. 154(b) by 0 days.

(21) Appl. No.: 13/522,405

(22) PCT Filed: Mar. 27, 2012

(86) PCT No.: PCT/JP2012/002130
§ 371 (c)(1),
(2), (4) Date: Aug. 13, 2012

(87) PCT Pub. No.: WO2012/132419
PCT Pub. Date: Oct. 4, 2012

(65) Prior Publication Data
US 2014/0013805 A1    Jan. 16, 2014

(30) Foreign Application Priority Data
Mar. 28, 2011 (JP) ................. 2011-070993

(51) Int. Cl.
C03B 17/06 (2006.01)
C03B 25/12 (2006.01)
C03C 3/091 (2006.01)

(52) U.S. Cl.
CPC .......... *C03B 17/067* (2013.01); *C03B 17/064* (2013.01); *C03B 25/12* (2013.01); *C03C 3/091* (2013.01)

(58) Field of Classification Search
CPC ...... C03B 17/06; C03B 17/064; C03B 17/067
See application file for complete search history.

(56) References Cited

U.S. PATENT DOCUMENTS 6,060,168 A * 5/2000 Kohli ........................... 428/428
8,056,367 B2 11/2011 Kin et al.
(Continued)

FOREIGN PATENT DOCUMENTS

JP    2-149438 A    6/1990
JP    3335291 B2   10/2002
(Continued)

OTHER PUBLICATIONS

Chinese Office Action (First Notice of Reason for Rejection) mailed Aug. 2, 2013 for corresponding Chinese Patent Application No. 201280001014.4.

*Primary Examiner* — Jason L Lazorcik
(74) *Attorney, Agent, or Firm* — Sughrue Mion, PLLC

(57) ABSTRACT

The method for producing a glass sheet by down-drawing includes an air pressure controlling step of controlling the air pressure of a furnace outside space formed between a furnace and a covering part that covers the furnace, the furnace including a forming furnace and a lehr, a melting step of melting glass raw materials to form molten glass, a supplying step of supplying the molten glass to a forming cell disposed inside the forming furnace, a forming step of forming a glass sheet by allowing the molten glass to flow down the forming cell, an annealing step of cooling the glass sheet while allowing the glass sheet to flow in one direction in the lehr, and a cutting step of cutting the glass sheet that has been cooled. In the air pressure controlling step, air pressure is controlled such that the air pressure is higher, inside the furnace outside space, at a position more toward the upstream side of the flow direction of the glass sheet.

18 Claims, 7 Drawing Sheets

(56) References Cited

U.S. PATENT DOCUMENTS

| | | | |
|---|---|---|---|
| 2003/0029199 A1* | 2/2003 | Pitbladdo | 65/195 |
| 2004/0154336 A1* | 8/2004 | Pitbladdo | 65/53 |
| 2005/0120748 A1* | 6/2005 | Xun et al. | 65/53 |
| 2007/0062219 A1* | 3/2007 | Blevins et al. | 65/91 |
| 2007/0068197 A1* | 3/2007 | Pitbladdo | 65/90 |
| 2009/0100873 A1* | 4/2009 | Allan et al. | 65/85 |
| 2009/0170684 A1* | 7/2009 | Kato et al. | 501/66 |
| 2009/0226733 A1 | 9/2009 | Kato et al. | |
| 2009/0314032 A1* | 12/2009 | Tomamoto et al. | 65/29.14 |
| 2010/0031702 A1* | 2/2010 | Tomamoto et al. | 65/91 |
| 2010/0122556 A1* | 5/2010 | Kin | C03B 17/064 65/90 |
| 2010/0218557 A1* | 9/2010 | Aniolek et al. | 65/97 |
| 2010/0269542 A1* | 10/2010 | Nishiura et al. | 65/95 |
| 2010/0281920 A1* | 11/2010 | Nishiura et al. | 65/95 |
| 2011/0277504 A1* | 11/2011 | Pitbladdo | 65/53 |
| 2013/0017366 A1* | 1/2013 | Kawaguchi et al. | 428/141 |
| 2013/0118206 A1* | 5/2013 | Maeda et al. | 65/91 |

FOREIGN PATENT DOCUMENTS

| | | |
|---|---|---|
| JP | 2008266098 A | 11/2008 |
| JP | 2009173525 A | 8/2009 |
| JP | 2009-196879 A | 9/2009 |
| WO | WO 2011118547 A1 * | 9/2011 |

\* cited by examiner

METHOD AND APPARATUS FOR MAKING GLASS SHEET

CROSS REFERENCE TO RELATED APPLICATIONS

This application is a National Stage of International Application No. PCT/JP2012/002130 filed Mar. 27, 2012, claiming priority based on Japanese Patent Application No. 2011-070993 filed Mar. 28, 2011, the contents of all of which are incorporated herein by reference in their entirety.

TECHNICAL FIELD

The present invention relates to a method and an apparatus for making a glass sheet.

BACKGROUND ART

Heretofore, down-drawing has been used as one of the methods for forming, for example, a glass substrate for a flat display such as a liquid crystal display and a glass sheet for cover glass.

An example of equipment for forming a glass sheet using down-drawing may be the equipment described in Patent Literature 1 (JP 2009-196879A) that is provided with a forming furnace including a forming cell on which molten glass is allowed to overflow from the top and a glass sheet is formed therebelow, and a lehr/cooling chamber for annealing the glass sheet.

SUMMARY OF INVENTION

Technical Problem

In recent years, highly precise liquid crystal displays are desired, and therefore there are demands for glass sheets with reduced internal strain that are used for liquid crystal displays. In addition, liquid crystal displays are becoming larger and larger, and glass sheets used therefor are also becoming larger. However, glass sheets are problematic in that the larger the size, the greater the internal strain.

Also, as large glass sheets are produced, equipment for producing glass sheets is becoming large. For example, in the case where a glass sheet is produced using down-drawing, furnaces such as a lehr that anneals such a glass sheet and a forming furnace for forming a glass sheet are also need to be large in accordance with production of large glass sheets.

Here, with the equipment described in Patent Literature 1 (JP 2009-196879A), it is expected that, for example, as a large furnace is used, a greater upward air flow is generated along the external surface of the furnace wall. Accordingly, there is a concern that the temperature of the outer surface of the furnace wall becomes non-uniform, and the temperature inside the furnace changes. Furthermore, there is a concern that due to the fact that a difference of temperatures is created between air in the vicinity of the surface of a glass sheet and air located more toward the outside (region near the furnace wall), an upward air flow that ascends along the surface of the glass sheet is created, resulting in a change of the temperature inside the furnace. Here, the term "to change" means that the temperature unintentionally changes from the preset temperature.

However, the step of annealing a glass sheet using a lehr or a cooling chamber is an important step not to generate strain in the glass sheet. Therefore, it is preferable that the temperature change inside the furnace can be suppressed.

Accordingly, an object of the present invention is to provide a method for producing a glass sheet and an apparatus for producing a glass sheet that, by suppressing a change of the temperature inside a furnace, enables the quality of the glass sheet to be retained, for example, an increase of internal strain of the glass sheet can be suppressed.

Solution to Problem

The method for producing a glass sheet of the present invention is a glass sheet production method by down-drawing.

The production method includes:

an air pressure controlling step of controlling the air pressure of a furnace outside space formed between a furnace and a covering part that covers the furnace, the furnace including a forming furnace and a lehr, a melting step of melting glass raw materials to form molten glass, a supplying step of supplying the molten glass to a forming cell disposed inside the forming furnace, a forming step of forming a glass sheet by allowing the molten glass to flow down the forming cell, an annealing step of cooling the glass sheet while allowing the glass sheet to flow in one direction in the lehr, and a cutting step of cutting the glass sheet that has been cooled.

The furnace outside space includes a forming furnace outside space including a region corresponding to the position where the forming furnace is disposed and a lehr outside space includes a region corresponding to the position where the lehr is disposed, and in the air pressure controlling step, the air pressure control is carried out such that at least the air pressure of the forming furnace outside space is higher than the air pressure of the lehr outside space.

It is preferable that in the air pressure controlling step, the air pressure control is carried out such that a position more toward the upstream side in the flow direction of the glass sheet inside the furnace outside space has a higher air pressure.

Also, it is preferable that the furnace outside space further includes a lower space located below an upper space including the forming furnace outside space and the lehr outside space, and in the air pressure controlling step, the air pressure control is carried out such that the air pressure of the lower space is equal to or higher than atmospheric pressure.

It is preferable that the difference between air pressures of the forming furnace outside space and the lehr outside space satisfies 0<(Air pressure of the forming furnace outside space−Air pressure of the lehr outside space)<20 [Pa].

Also, it is preferable that the glass sheet has a length in the width direction of 2000 mm or greater.

Also, it is preferable that the glass sheet is a glass substrate for a liquid crystal display.

Note that it is preferable that the forming step includes a step of more rapidly cooling the opposite ends in the width direction of the glass sheet than the central part in the width direction of the glass sheet, to obtain glass viscosity η at the opposite ends satisfying log η=9 to 14.5.

Also, it is preferable that in the annealing step, at least in a temperature range from the temperature of the glass annealing point of the glass sheet plus 150° C. to the temperature of the glass strain point of the glass sheet minus 200° C., the rate of cooling the central part in the width direction of the glass sheet is higher than the rate of cooling the opposite ends in the width direction of the glass sheet, and the glass sheet is shifted from a state in which the temperature of the central part in the width direction of the glass sheet is higher than the temperature of the opposite ends in the width direction to a state in which the temperature of the central part is lower than the temperature of the opposite ends, such that tensile stress acts in the direction of the flow of the glass sheet.

Also, it is preferable that in the annealing step, the following above-glass-strain-point temperature controlling step is carried out.

The above-glass-strain-point temperature controlling step is a step of carrying out, from a lower part of the forming cell, temperature control of the glass sheet in the width direction in a temperature range extending to a temperature lower than a temperature range in the vicinity of the glass strain point, and includes:

a step of controlling the temperature of the opposite ends in the width direction of the glass sheet so as to be lower than the temperature of the central region sandwiched between the opposite ends, and controlling the temperature of the central region so as to be uniform, a step of controlling the temperature in the width direction of the glass sheet such that the temperature is lower toward the opposite ends from the central part, and a step of controlling the temperature such that there is no temperature gradient between the central part and the opposite ends in the temperature range in the vicinity of the glass strain point.

Also, it is preferable that in the step of carrying out temperature control on the glass sheet in the width direction, a below-glass-strain-point temperature control step is further carried out.

The below-glass-strain-point temperature control step includes:

a step of controlling the temperature from the opposite ends in the width direction of the glass sheet to the central part in the width direction of the glass sheet so as to be uniform in a temperature range in the vicinity of the glass strain point of the glass sheet, and a step of allowing the temperature of the glass sheet that has become uniform to be lower from the opposite ends to the central part to decrease the temperature toward the central part from the opposite ends.

It is preferable that the annealing step includes a first cooling step, a second cooling step, and a third cooling step.

In the first cooling step, cooling is carried out at a first average cooling rate until the temperature of the central part in the width direction of the glass sheet reaches the glass annealing point of the glass sheet.

In the second cooling step, cooling is carried out at a second average cooling rate until the temperature of the central part reaches the glass strain point minus 50° C. from the glass annealing point.

In the third cooling step, cooling is carried out at a third average cooling rate until the temperature of the central part reaches the glass strain point minus 200° C. from the glass strain point minus 50° C.

The first average cooling rate is 5.0° C./second or higher.

The first average cooling rate is higher than the third average cooling rate.

The third average cooling rate is higher than the second average cooling rate.

Also, it is preferable that the glass sheet has a total SrO and BaO content of less than 8 mass % and a glass strain point of 675° C. or higher, and in the annealing step, the average cooling rate from the glass annealing point of the glass sheet to the temperature of (glass strain point minus 50° C.) is less than 0.5 to 5.5° C./second.

It is preferable that in the annealing step, not to generate plastic deformation in an adjacent region that is adjacent to a portion sandwiched between rollers used to draw the glass sheet and that is on the inner side in the width direction of the glass sheet, tensile stress is allowed to act on the glass sheet in the direction in which the glass sheet flows in a temperature range in which the temperature of the adjacent region is equal to or higher than the glass transition point and equal to or lower than the glass softening point of the glass sheet.

Also, it is preferable that in the annealing step, drives of rollers that draw down the glass sheet are controlled such that the peripheral speed of rollers disposed, in a flow direction of the glass sheet, on the downstream side of a temperature range in which the temperature of the glass sheet is at the glass annealing point is equal to or greater than the peripheral speed of rollers disposed in a temperature range in which the temperature of the glass sheet is equal to or higher than the glass transition point and equal to or lower than the glass softening point.

The apparatus for producing a glass sheet of the present invention includes a forming furnace, a lehr, and a control section. The forming furnace forms a glass sheet by down-drawing. The lehr cools the glass sheet formed in the forming furnace while allowing the glass sheet to flow in one direction. The control section controls the air pressure of the furnace outside space formed between the furnace and the covering part that covers the furnace, the furnace including the forming furnace and the lehr. The control section carries out the air pressure control such that a position more toward the upstream side of the flow direction of the glass sheet has a higher air pressure inside the furnace outside space.

Also, the apparatus for producing a glass sheet includes a forming furnace, a lehr, and a control section. The forming furnace forms a glass sheet by down-drawing. The lehr cools the glass sheet formed in the forming furnace. The control section carries out air pressure control on the furnace outside space. The furnace outside space is formed between the furnace and the covering part. The furnace includes a forming furnace and a lehr. The furnace outside space includes a forming furnace outside space that includes a region corresponding to the position where the forming furnace is disposed and a lehr outside space that includes a region corresponding to the position where the lehr is disposed. The control section carries out air pressure control such that the air pressure of the forming furnace outside space is higher than the air pressure of the lehr outside space.

Advantageous Effects of Invention

In the present invention, a change of temperature in the furnace is suppressed, and it is thus possible to retain the quality of a glass sheet. For example, it is possible to suppress an increase of internal strain of a glass sheet.

DESCRIPTION OF EMBODIMENTS

Below, a glass sheet production method for producing a glass sheet using a glass sheet production apparatus 100 of this embodiment will now be described with reference to the drawings.

The following terms and phrases as used herein are defined as follows.

The term "glass annealing point" refers to the temperature at which $\log \eta = 13$ with $\eta$ being the glass viscosity.

The term "glass strain point" refers to the temperature at which $\log \eta = 14.5$ with $\eta$ being the glass viscosity.

The phrase "in the vicinity of the glass strain point" refers to the temperature range from (strain point plus 25° C.) to (strain point minus 50° C.).

The term "glass softening point" refers to the temperature at which $\log \eta = 7.65$ with $\eta$ being the glass viscosity.

The phrase "central part of a glass ribbon" refers to the center in the width direction of a glass ribbon in regard to the width in the width direction of the glass ribbon.

The phrase "end of a glass ribbon" refers to a range up to 100 mm from an edge in the width direction of the glass ribbon.

(1) OUTLINE OF GLASS SHEET PRODUCTION METHOD

Figure 1:
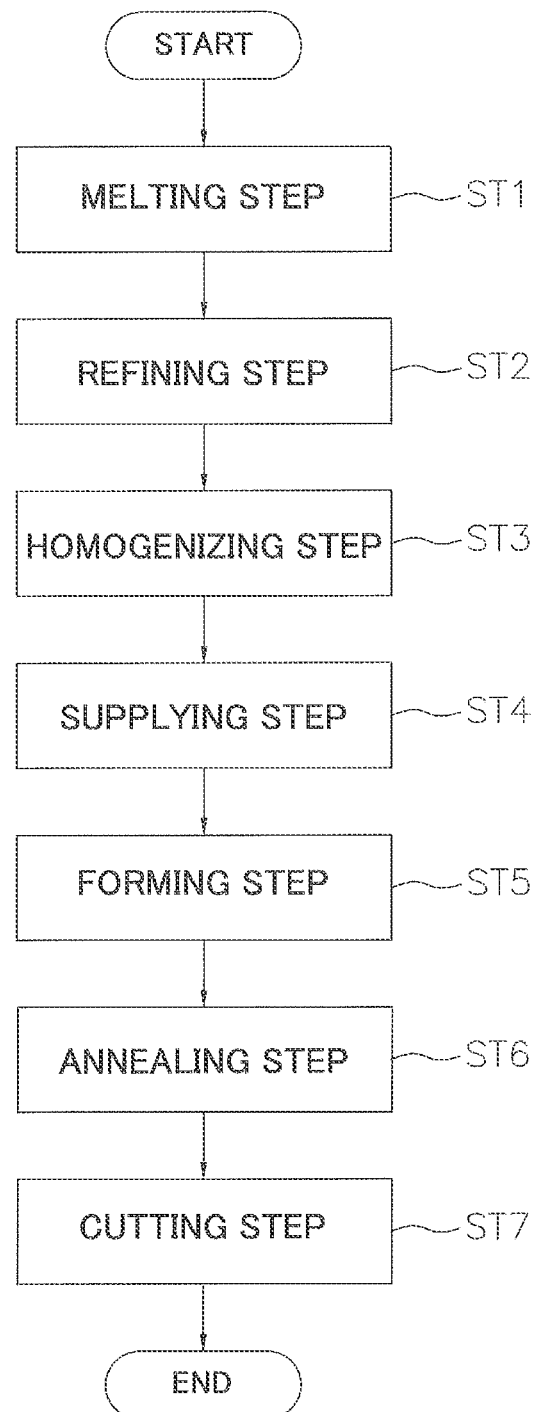
FIG. 1 is a flowchart depicting a part of the glass sheet production method according to an embodiment.

FIG. 1 is a flowchart depicting a part of the glass sheet production method according to this embodiment. Below, the glass sheet production method will now be described using FIG. 1.

As depicted in FIG. 1, a glass sheet is produced through various steps including melting step ST1, refining step ST2, homogenizing step ST3, supplying step ST4, forming step ST5, annealing step ST6, and cutting step ST7. Below, these steps will now be described.

In the melting step ST1, glass raw materials are heated and melted to give molten glass. The glass raw materials are composed of $SiO_2$, $Al_2O_3$, and the like.

In the refining step ST2, the molten glass is clarified. Specifically, gaseous components contained in the molten glass are released out of the melting glass, or gaseous components contained in the molten glass are absorbed into the molten glass.

In the homogenizing step ST3, the molten glass is homogenized. In this step, temperature regulation of the molten glass that has been clarified is also carried out.

In the supplying step ST4, the molten glass is supplied to a forming device 300 (specifically, a forming cell 310) (this will be described below). In this step, the molten glass is cooled to a temperature suitable for starting formation of a glass sheet G.

In the forming step ST5, the molten glass is formed into the glass sheet G having a plate shape. In this embodiment, the molten glass is formed into the glass sheet G having a plate shape by overflow down-drawing.

In the annealing step ST6, the glass sheet G having a plate shape formed in the forming step ST5 is cooled.

In the cutting step ST7, the cooled glass sheet G is cut at intervals of a specific length.

The glass sheet G1 cut at intervals of a specific length (see, for example, FIG. 3) is then further cut and subjected to grinding/polishing, washing, and inspection, and thus becomes a glass sheet (a glass sheet that is not given any reference sign refers to a final-product glass sheet in the specification) and is applied to a flat panel display such as a liquid crystal display or an organic EL display, or the like.

(2) Outline of glass sheet production apparatus 100

Figure 2:
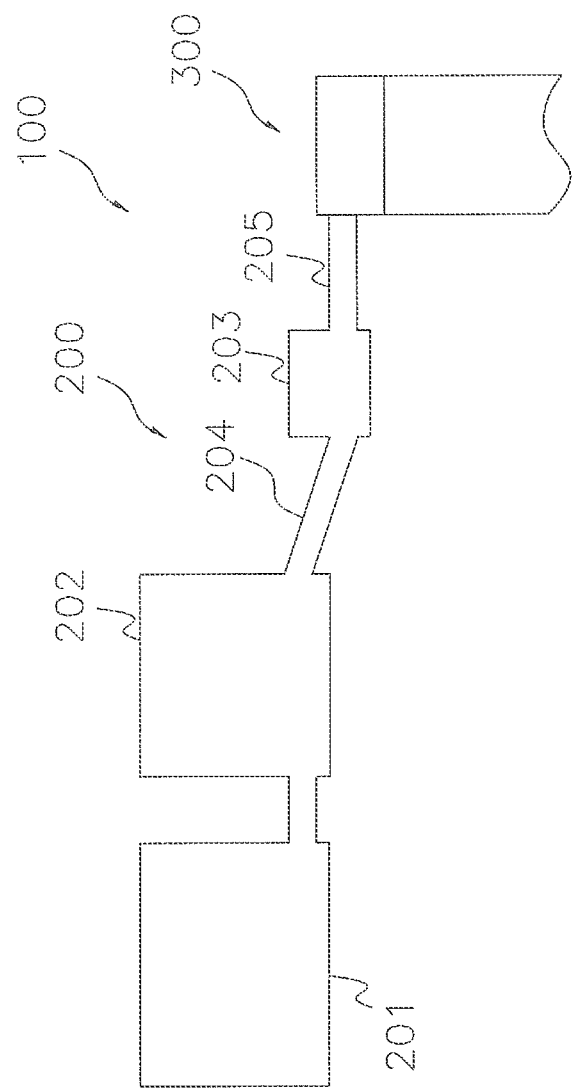
FIG. 2 is a schematic view mainly depicting a melting device included in a glass sheet production apparatus.
Figure 3:
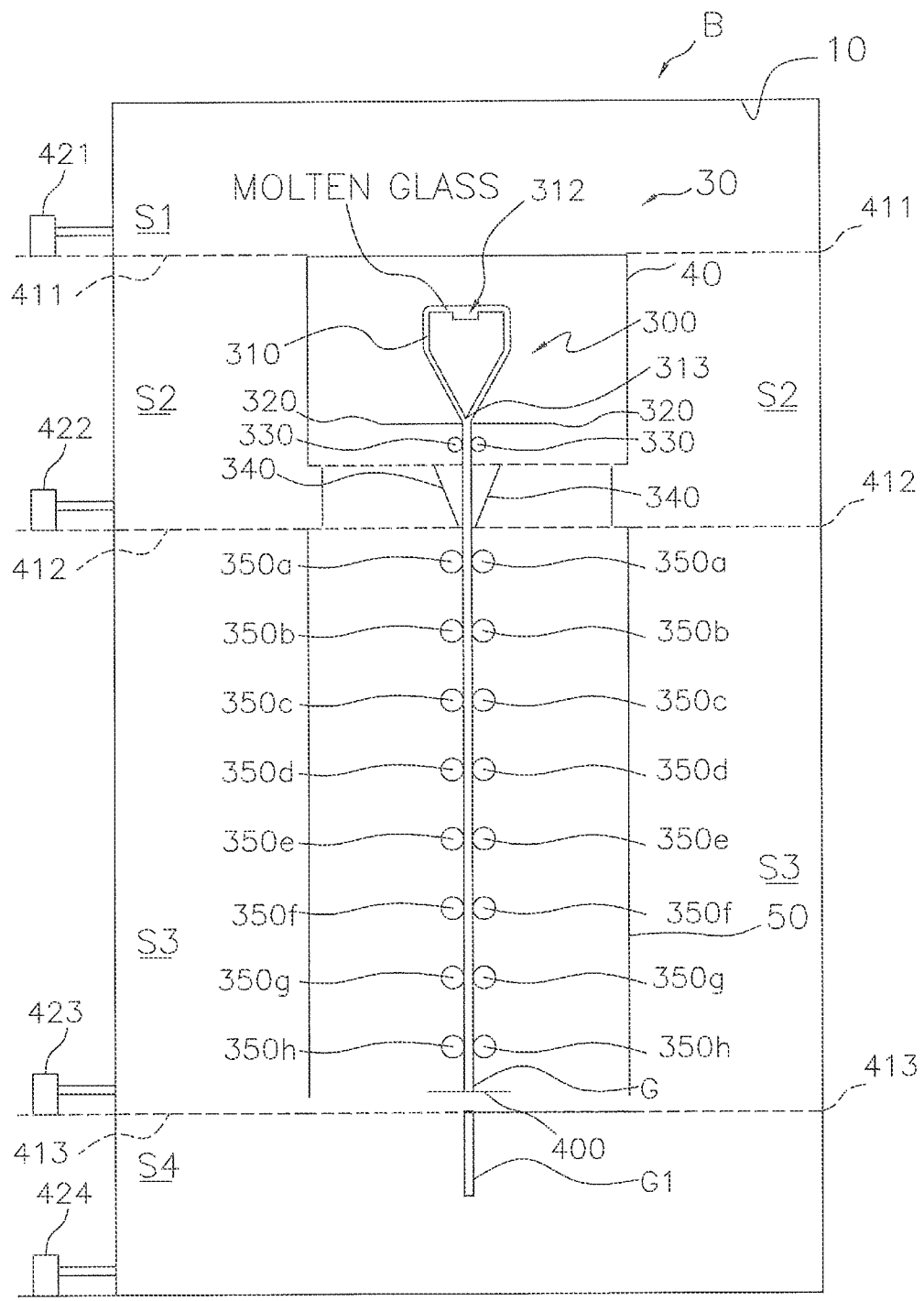
FIG. 3 is a schematic view depicting inside a housing.

FIG. 2 is a schematic view mainly depicting a melting device 200 included in a glass sheet production apparatus 100. FIG. 3 is a schematic view depicting inside a housing B in which various devices and the like included in the glass sheet production apparatus 100 are accommodated or attached (in FIG. 3, a forming device 300, a furnace 30, and like components are depicted in a schematic cross-sectional drawing). Below, the glass sheet production apparatus 100 will now be described.

The glass sheet production apparatus 100 mainly has the melting device 200 (see FIG. 2), the forming device 300 (see FIGS. 2 and 3), and a cutting device 400 (see FIG. 3). The melting device 200, the forming device 300, and the cutting device 400 are disposed in the housing B (see FIG. 3).

(2-1) Configuration of melting device 200

The melting device 200 is a device for carrying out the melting step ST1, the refining step ST2, the homogenizing step ST3, and the supplying step ST4.

As depicted in FIG. 2, the melting device 200 has a melting furnace 201, a refining furnace 202, a stirring tank 203, a first pipe 204, and a second pipe 205.

The melting furnace 201 is a vessel for melting glass raw materials. The melting step ST1 is carried out in the melting vessel 201.

The refining furnace 202 is a tube to remove bubbles from the molten glass melted in the melting furnace 201. Further heating, in the refining furnace 202, the molten glass that has been sent from the melting furnace 201 facilitates removal of bubbles present in the molten glass. The refining step ST2 is carried out in the refining furnace 202.

The stirring tank 203 includes a container that accommodates the molten glass, a rotation shaft, and a plurality of stirring blades attached to the rotation shaft. Usable examples of the container, the rotation shaft, and the stirring blades include, but are not limited to, those that are made of platinum group metals such as platinum or alloys of platinum group metals. Drive of a driving part (not depicted) rotates the rotation shaft, and thereby the plurality of stirring blades attached to the rotation shaft stir the molten glass. The homogenizing step ST3 is carried out in the stirring tank 203.

The first pipe 204 and the second piping 205 are pipes made of platinum group metals (platinum, iridium, osmium, palladium, rhodium, ruthenium, and the like) or alloys of platinum group metals. The first pipe 204 is a pipe that connects the refining furnace 202 and the stirring tank 203. The second pipe 205 is a pipe that connects the stirring tank 203 and the forming device 300.

(2-2) Configuration of forming device 300

Figure 4:
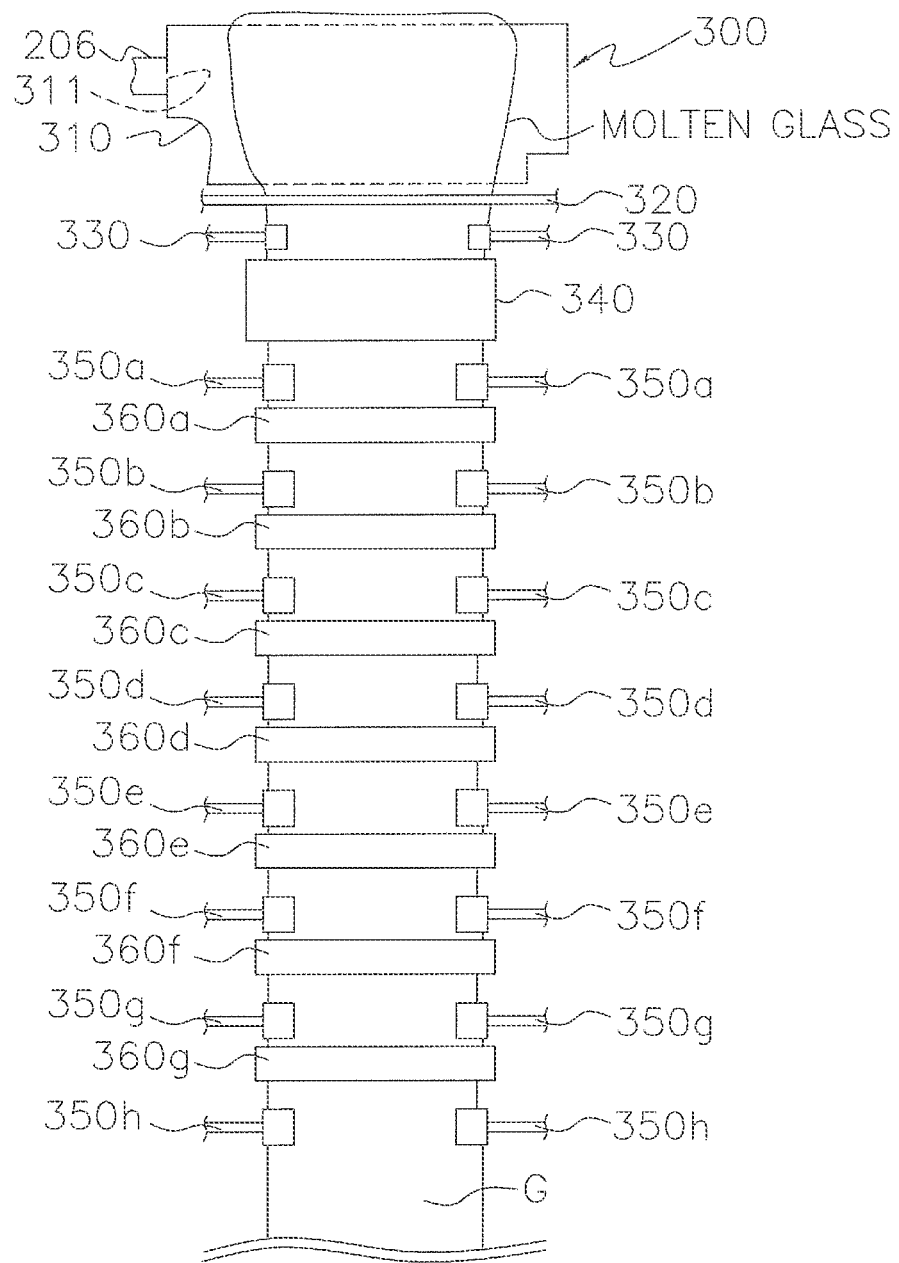
FIG. 4 is a schematic side view depicting an outline of a forming device.

FIG. 4 is a side view depicting an outline of the forming device 300.

The forming device 300 is a device to carry out the forming step ST5 and the annealing step ST6.

The forming device 300 has the forming cell 310, atmosphere separating members 320, cooling rollers 330, cooling units 340, feed rollers 350a to 350h, and temperature regulating units 360a to 360g (see FIG. 4). Below, the configurations of these components will now be described.

(2-2-1) Forming cell 310

As depicted in FIG. 3, the forming cell 310 is positioned in an upper part of the forming device 300, and has a function to form molten glass flowing in from the melting device 200 into glass having a plate shape (i.e., the glass sheet G). The forming cell 310, if cut in the vertical direction, has a wedge-shaped cross-section and is composed of brick.

As depicted in FIG. 4, the forming cell 310 has an inlet 311 formed on the upstream side in the direction of the flow channel in which the molten glass flows. The molten glass flowing in from the melting device 200 is supplied to the forming cell 310 (forming device 300) via the inlet 311.

In the forming cell 310, a groove 312 (see FIG. 3) that is open at the top is formed along the longitudinal direction of the forming cell. The groove 312 is formed so as to be gradually shallower toward the downstream side from the upstream side in the direction of the flow channel for the molten glass. The molten glass that has overflowed the groove 312 of the forming cell 310 and has flowed down both side walls of the forming cell 310 meets at a bottom end 313, thus giving the glass sheet G.

(2-2-2) Atmosphere separating members 320

As depicted in FIGS. 3 and 4, the atmosphere separating members 320 are plate-shaped members disposed in the vicinity of the bottom end 313 of the forming cell 310. The atmosphere separating members 320 are disposed substantially horizontally on the respective sides of the glass sheet G in the thickness direction, which flows toward the downstream side in a first direction, or a vertical direction, after the molten glass meets at the bottom end 313 of the forming cell 310. The atmosphere separating members 320 serve as a heat insulating material. That is, thermally separating the spaces above and below the atmosphere separating members 320, the atmosphere separating members 320 suppress transfer of heat from the side above to the side below the atmosphere separating members 320. Suppressing transfer of heat from the side above to the side below the atmosphere separating members 320 makes it easy to carry out control by which the opposite ends in the width direction of the plate-shaped glass sheet G are sufficiently rapidly cooled on the side below the atmosphere separating members 320. Accordingly, it is possible to suppress shrinking in the width direction of the glass sheet G after leaving the forming cell 310, which is formed when the molten glass overflowed from the forming cell 310 meets at the bottom end 313 of the forming cell 310.

(2-2-3) Cooling Rollers 330

The cooling rollers 330 are disposed below the atmosphere separating members 320. Also, the cooling rollers 330 are disposed on the respective sides in the thickness direction of the glass sheet G flowing toward the downstream side in the first direction after meeting at the bottom end 313 of the forming cell 310 and disposed in the vicinity of the opposite ends (portions on the respective sides) in the width direction of the glass sheet G. The cooling rollers 330 contact the opposite ends (portions on the respective sides) of the glass sheet G in the width direction, and thus cool the glass sheet G. More specifically, the cooling rollers 330 draw down the glass sheet G toward the downstream side in the first direction, and thus form the glass sheet G that has a desired thickness and cool the glass sheet G. In the description provided below, the direction in which the glass sheet G flows is regarded as the first direction.

Here, the forming cell 310, the atmosphere separating members 320, and the cooling rollers 330 are housed in a forming furnace 40 disposed inside the housing B. The forming furnace 40 has a cuboidal shape, with a space that is open downward being formed. The forming step ST5 is carried out in the forming furnace 40.

(2-2-4) Cooling Units 340

The cooling units 340 are disposed below the forming furnace 40. The cooling units 340 cool the glass sheet G that travels between the cooling rollers 330 and flows toward the downstream side in the first direction. The cooling effect thereof enables warpage of the glass sheet to be reduced.

(2-2-5) Feed Rollers 350a to 350h

Feed rollers 350a to 350h are disposed at specific intervals in the first direction below the cooling rollers 330. The feed rollers 350a to 350h are disposed on the respective sides in the thickness direction of the glass sheet G. The feed rollers 350a to 350h draw the glass sheet G toward the downstream side in the first direction.

(2-2-6) Temperature Regulating Units 360a to 360g

The temperature regulating units 360a to 360g are instruments that regulate atmosphere temperature in the vicinity of the glass sheet G (specifically, increase temperature), and a plurality thereof are disposed in the first direction and a plurality thereof are disposed in the width direction of the glass sheet G.

Here, the feed rollers 350a to 350h and the temperature regulating units 360a to 360g are housed in a lehr 50. The lehr 50 has a substantially cuboidal shape such that a space is formed so as to extend in the first direction.

In the lehr 50, the annealing step ST6 is carried out in which the glass sheet G is drawn toward the downstream side in the first direction by the feed rollers 350a to 350h, and the glass sheet G is thus annealed (shifts from a viscous region to an elastic region via a viscoelastic region). In the annealing step ST6, the temperature regulating units 360a to 360g regulate atmosphere temperature in the vicinity of the glass sheet G so as to suppress the internal strain of the glass sheet.

In the vicinity of the respective temperature regulating units 360a to 360g, a plurality of temperature sensors are disposed along the glass sheet G in the width direction as atmosphere temperature sensing means for sensing atmosphere temperature in the vicinity of the glass sheet G. Here, a plurality of such temperature sensors are collectively referred to as a temperature sensor unit 380 (see FIG. 5).

(2-3) Cutting Device 400

The cutting step ST7 is carried in the cutting device 400. The cutting device 400 is a device that cuts, from a direction perpendicular to the surface of the glass sheet G extending toward the downstream side, the plate-shaped glass sheet G flowing down from the forming device 300 toward the downstream side in the first direction. Accordingly, the plate-shaped glass sheet G yields a plurality of glass sheets G1 having a specific length.

(3) Control device 500

Figure 5:
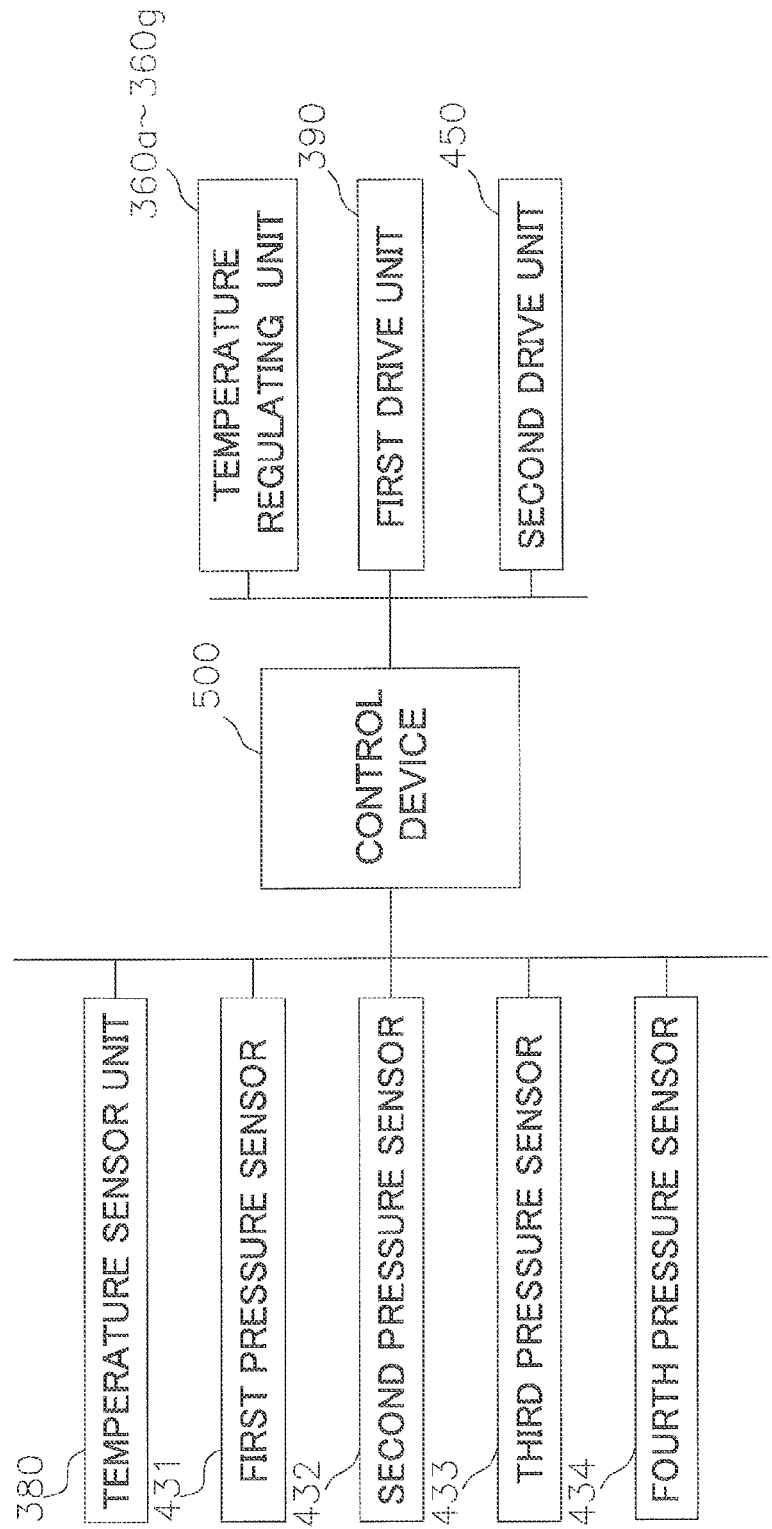
FIG. 5 is a control block diagram of a control device.

FIG. 5 is a control block diagram of a control device 500.

First, the control device 500 is composed of a CPU, a ROM, a RAM, a hard disk, and the like, and functions as a control section that controls various instruments included in the glass sheet production apparatus 100.

Specifically, as depicted in FIG. 5, the control device 500 executes the temperature regulating control of the temperature regulating units 360a to 360g, the drive control of a first drive unit 390 (for example, a motor) for driving the cutting device and a second drive unit 450 (which will be described below) for driving the cooling rollers 330, the feed rollers 350a to 350h and the like, and other controls. Note that the temperature regulating control of the temperature regulating units 360a to 360g is executed based on the atmosphere temperature of the glass sheet G sensed by the temperature sensor unit 380.

The control device 500 further controls the air pressure of the inside space of the housing B. This will be described below. Also, the various sensors depicted in FIG. 5 will be described below.

(4) Formation of glass sheet G in forming device 300

Below, a process of formation of the glass sheet G in the forming device 300 will now be described.

First, molten glass supplied from the melting device 200 to the forming cell 310 via the inlet 311 flows in the groove 312 of the forming cell 310, and then overflows the groove 312. Molten glass that has overflowed the groove 312 flows along the respective sides of the forming cell 310 toward the downstream side in the first direction, and as depicted in FIG. 3, meets at the bottom part 313. Molten glass that has met at the bottom part 313 flows toward the downstream side in the first direction.

The opposite ends in the width direction of molten glass that flows downward toward the downstream side in the first direction are sandwiched between the cooling rollers 330 disposed on the respective sides in the thickness direction, and molten glass is drawn down toward the downstream side in the first direction. At this time, molten glass is formed into the plate-shaped glass sheet G and cooled simultaneously. The glass sheet G drawn down by the cooling rollers 330 is further drawn downward by the feed rollers 350a to 350h and annealed simultaneously.

Note that the glass sheet G drawn down by the feed rollers 350a to 350h is then cut at intervals of a specific length by the cutting device 400 into a plurality of glass sheets G1.

(5) Control of air pressure of inside space of housing B

Figure 6:
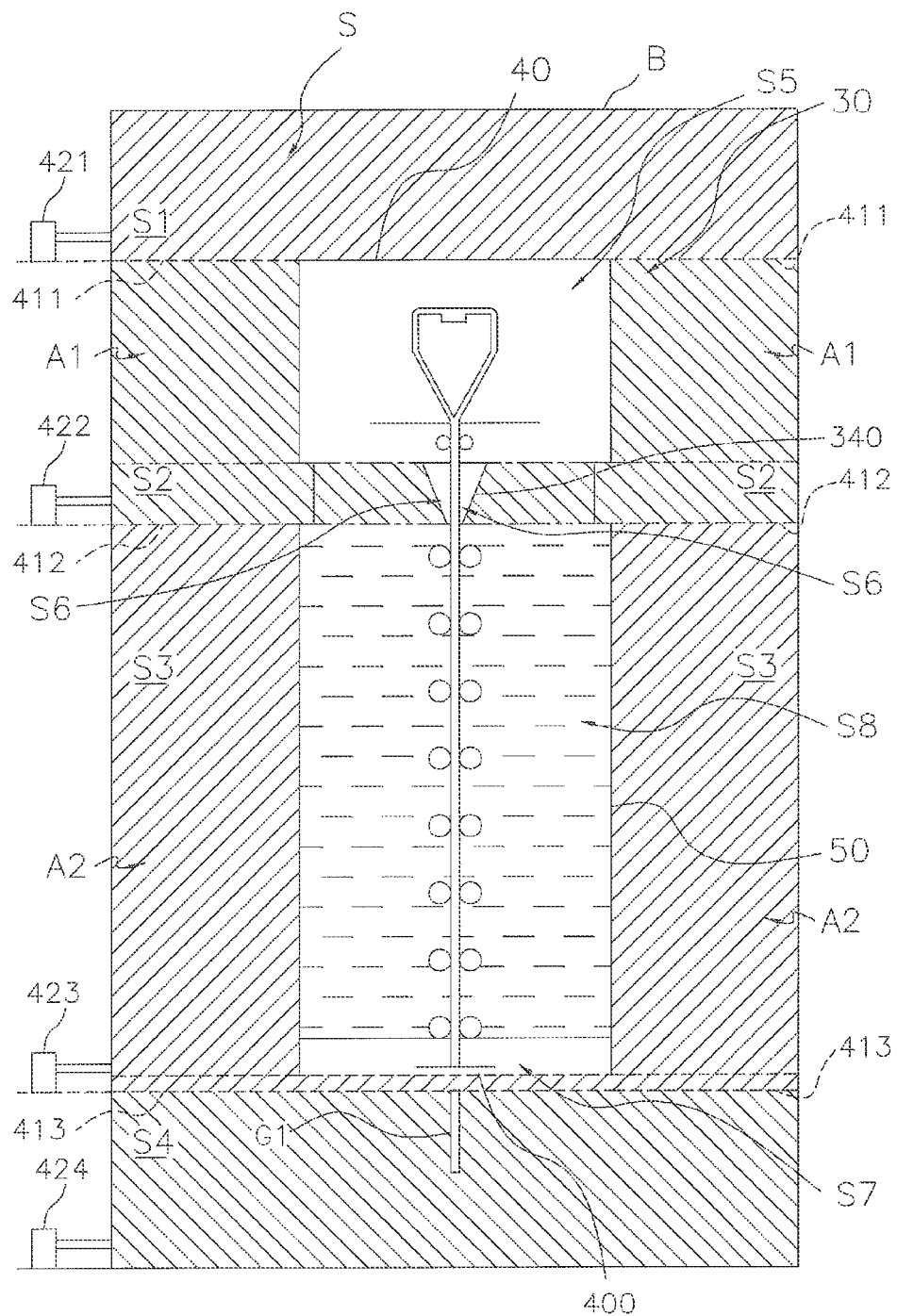
FIG. 6 is a schematic view depicting the inside space of the housing to depict a furnace outside space.

FIG. 6 is a schematic view depicting the inside space of the housing B to depict the furnace outside space S.

Hitherto, an example of equipment for forming a glass sheet using down-drawing may be the equipment described in Patent Literature 1 (JP 2009-196879A) that is provided with a forming cell on which molten glass is allowed to overflow from the top and a glass sheet is formed therebelow, and a lehr/cooling chamber for annealing the glass sheet (a member that carries out a step corresponding to the annealing step ST6 of this embodiment).

With the equipment described in Patent Literature 1 (JP 2009-196879A), there is a concern that, for example, in the case where an upward air flow that ascends along the surface of a glass sheet is generated due to the difference of temperatures created between air in the vicinity of the surface of the glass sheet and air located more toward the outside (region near the furnace wall), the temperature inside the furnace changes. For example, it is not possible with the equipment described in Patent Literature 1 to sufficiently suppress the problem in that generation of an upward air flow along the outer surface of the furnace wall allows the outer surface of the furnace wall to be cooled. That is, with the outer surface of the furnace wall being cooled, the atmosphere inside the furnace in the vicinity of the inner surface of the furnace wall is cooled, thus resulting in a problem in that the atmosphere temperature inside the furnace changes. Meanwhile, the step of forming a glass sheet using a forming furnace is an important step to reduce, for example, a deviation of sheet thickness within the glass sheet. Also, the step of annealing the glass sheet using a lehr, or a cooling chamber, is an important step to reduce, for example, internal strain and warpage of the glass sheet. Therefore, it is preferable to suppress a change of the temperature inside the furnace.

Accordingly, in this embodiment, air pressure control is carried out on the furnace outside space S formed between the furnace 30 and an inner surface part 10 (which corresponds to the covering part) of the housing B which covers the furnace 30. The furnace 30 includes the forming furnace 40 in which the forming cell 310 and the like are disposed and the lehr 50 in which the feed rollers 350a to 350h and the like are disposed. The furnace outside space S is the inside space of the housing B as well as the outside space of the furnace 30. The air pressure controlling step of carrying out such air pressure control is initiated, for example, at the time of carrying out the homogenizing step ST3. That is, the air pressure controlling step is carried out prior to the forming step ST5 and the annealing step ST6.

(5-1) Furnace outside space S

As depicted in FIG. 6, the furnace outside space S more specifically is a space (space indicated by diagonal lines in FIG. 6), which is defined by subtracting, from the inside space of the housing B, a forming furnace inside space S5 (space enclosed by the bold line and the dashed dotted line) of the forming furnace 40, a space S6 sandwiched between the cooling units 340 disposed on the respective sides in the thickness direction of the glass sheet G, a lehr inside space S8 of the lehr 50 (the space enclosed by the bold line and the dashed double-dotted line), and a space S7.

The furnace outside space S is divided into a plurality of spaces by floors 411, 412, and 413 disposed inside the housing B. That is, the floors 411, 412, and 413 play a role as dividing members to divide the furnace outside space S into a plurality of spaces.

Specifically, the furnace outside space S is divided by the floors 411, 412, and 413 into an upper forming furnace outside space S1, a lower forming furnace outside space S2, a lehr outside space S3, and a lower lehr outside space S4.

The upper forming furnace outside space S1 is a space sandwiched between the floor 411 and the upper part of the housing B in the furnace outside space S. The position of the floor 411 in terms of height position is close to the upper part of the forming cell 310, and the floor 411 is disposed in a place close to the upper part of the furnace 40.

The lower forming furnace outside space S2 is a space formed more toward the downstream side in the first direction than the upper forming furnace outside space S1. Specifically, the lower forming furnace outside space S2 is a space enclosed by the floor 411, the floor 412, and the cooling units 340 in the furnace outside space S. Also, the lower forming furnace outside space S2 includes a forming channel corresponding region A1 that is a region corresponding to the position where the forming furnace 40 is disposed (specifically, a position at the same height as the position where the forming furnace 40 is disposed). In terms of height position, the floor 412 is disposed in a position close to the lower parts of the cooling units 340.

The lehr outside space S3 is a space formed more toward the downstream side in the first direction than the lower forming furnace outside space S2. The lehr outside space S3 is a space sandwiched between the floor 412 and the floor 413 in the furnace outside space S. Also, the lehr outside space S3 includes a lehr corresponding region A2 that is a region corresponding to the place where the lehr 50 is disposed (specifically, places at the same height position as the position where the lehr 50 is disposed). In terms of height position, the floor 413 is disposed in a position close to the cutting device 400.

Also, the lehr outside space S3 is a space such that the atmosphere temperature of the glass sheet G flowing in a lehr inside space S8 (the space indicated by the horizontal dotted-line etching in FIG. 6) that is at the same height position as the lehr outside space S3 (i.e., corresponding to the distance from the bottom surface of the floor 412 to the top surface of the floor 413) is, for example, 800° C. to 110° C. Alternatively, the lehr outside space S3 is a space including a region where the glass sheet G flowing through the lehr inside space S8 has a temperature between (annealing point plus 5° C.) and (strain point minus 50° C.).

The lower lehr outside space S4 is a space formed on the downstream side in the first direction of the lehr outside space S3. The lower lehr outside space S4 is a space sandwiched between the floor 413 and the lower part of the housing B in the furnace outside space S. In the lower lehr outside space S4, the glass sheet G flowing in the first direction in the forming device 300 is cut at intervals of a specific length by the cutting device 400.

Here, the furnace 30 (including the forming furnace 40 and the lehr 50) is composed of, for example, a fire resisting material, a heat insulating material, or the like. Also, known refractories or the like that are generally used when constructing a housing are applicable to the housing B. Moreover, although an embodiment has been described using an example in which the floors 411, 412, and 413 are used as dividing members, known floors that are generally used when constructing a housing are applicable to the floors 411, 412, and 413.

(5-2) Air pressure control

In the air pressure control, the furnace outside space S is pressurized such that the air pressure of the furnace outside space S is increased toward the upstream side in the first direction. Specifically, in the air pressure control, the air pressures of a plurality of partitioned spaces (i.e., the upper forming furnace outside space S1, the lower forming furnace outside space S2, the lehr outside space S3, and the lower lehr outside space S4) are independently controlled such that the air pressure values of the respective spaces satisfy the upper forming furnace outside space S1>the lower forming furnace outside space S2>the lehr outside space S3>the lower lehr outside space S4.

Note that, in order to carry out the air pressure control, on the outside of the upper forming furnace outside space S1, the lower forming furnace outside space S2, the lehr outside space S3, and the lower lehr outside space S4 (i.e., in the outside space beyond the wall of the housing B), fans 421, 422, 423, and 424 to pressurize the spaces are disposed, respectively.

Also, in order to carry out the air pressure control, a first pressure sensor 431, a second pressure sensor 432, a third pressure sensor 433, and a fourth pressure sensor 434 (see FIG. 5) that are means of sensing the air pressures of the upper forming furnace outside space 51, the lower forming furnace outside space S2, the lehr outside space S3, and the lower lehr outside space S4 are provided in the respective spaces.

In the air pressure control, according to the sensed air pressures of the upper forming furnace outside space 51, the lower forming furnace outside space S2, the lehr outside space S3, and the lower lehr outside space S4, the air pressure of the furnace outside space S is increased toward the upstream side in the first direction. Specifically, according to the sensed air pressures of the upper forming furnace outside space S1, the lower forming furnace outside space S2, the lehr outside space S3, and the lower lehr outside space S4, the operation (for example, revolutions in the case of a motor) of the second drive unit 450 (for example, a motor) for driving the fans 421, 422, 423, 424 is controlled.

Note that air pressure data for the spaces S1, S2, S3, and S4 sensed here is stored as data in the control device 500.

In the air pressure control, control is carried out such that the air pressure of the lower lehr outside space S4, which has the lowest air pressure in the furnace outside space S, is equal to or higher than atmospheric pressure. When the air pressure of the lower lehr outside space is equal to or higher than a specific pressure, a flow of air into the furnace is readily generated, and there is a concern that the temperature inside the furnace is affected. Accordingly, in the air pressure control, the air pressure of the lower lehr outside space S4 is controlled so as to be equal to or higher than atmospheric pressure and lower than a specific pressure. More specifically, the air pressure of the lower lehr outside space S4 is controlled so as to be equal to or higher than atmospheric pressure and equal to or lower than the air pressure of the furnace inside space (the air pressure of the furnace inside space). For example, the air pressure of the lower lehr outside space S4 is preferably 0<(Air pressure of lower lehr outside space S4−atmospheric pressure), more preferably 0<(Air pressure of lower lehr outside space S4−atmospheric pressure)<40 [Pa], and even more preferably 5 [Pa]<(Air pressure of lower lehr outside space S4−atmospheric pressure)<40 [Pa].

The difference between the air pressures of the lehr outside space S3 and the lower lehr outside space S4 is preferably 0<(Air pressure of lehr outside space S3−air pressure of lower lehr outside space S4), more preferably 0<(Air pressure of lehr outside space S3−Air pressure of lower lehr outside space S4)<20 [Pa], still more preferably 1 [Pa]<(Air pressure of lehr outside space S3−Air pressure of lower lehr outside space S4)<15 [Pa], and even more preferably 2 [Pa]<(Air pressure of lehr outside space S3−Air pressure of lower lehr outside space S4)<15 [Pa].

The difference between the air pressures of the lower forming furnace outside space S2 and the lehr outside space S3 is preferably 0<(Air pressure of lower forming furnace outside space S2−air pressure of lehr outside space S3), more preferably 0<(Air pressure of lower forming furnace outside space S2−Air pressure of lehr outside space S3)<20 [Pa], still more preferably 1 [Pa]<(Air pressure of lower forming furnace outside space S2−Air pressure of lehr outside space S3)<15 [Pa], and even more preferably 2 [Pa]<(Air pressure of lower forming furnace outside space S2−Air pressure of lehr outside space S3)<15 [Pa].

The difference between the air pressures of the upper forming furnace outside space S1 and the lower forming furnace outside space S2 is preferably 0<(Air pressure of upper forming furnace outside space S1−Air pressure of lower forming furnace outside space S2), more preferably 0<(Air pressure of upper forming furnace outside space S1−Air pressure of lower forming furnace outside space S2)<30 [Pa], still more preferably 1 [Pa]<(Air pressure of upper forming furnace outside space S1−Air pressure of lower forming furnace outside space S2)<25 [Pa], and even more preferably 2 [Pa]<(Air pressure of upper forming furnace outside space S1−Air pressure of lower forming furnace outside space S2)<15 [Pa]. In the case where the difference between the air pressures of the lehr outside space S3 and the lower lehr outside space S4, the difference between the air pressures of the lower forming furnace outside space S2 and the lehr outside space S3, and the difference between the air pressures of the upper forming furnace outside space S1 and the lower forming furnace outside space S2 are excessive, the absolute values of the air pressures of the upper forming furnace outside space S1, the lower forming furnace outside space S2, and the lehr outside space S3 become excessively large, air flows into the furnace 30 from the furnace outside space S, and there is a concern of creating a problem in that the temperature inside the furnace 30 changes. Moreover, a local concentration of an air flow and a local increase of the flow rate of an air flow may occur in the furnace outside space S, and there is a concern that the air pressure stability of the furnace outside space S deteriorates. As a result, there is a concern that the temperature inside the furnace 30 changes.

(5') Management of temperature of molten glass or glass sheet G inside furnace 30

Inside the forming furnace 40, the cooling rollers 330 come into contact with the opposite ends (portions on the respective sides) in the width direction of the glass sheet G formed from molten glass that has met at the bottom end 313 of the forming cell 310, and cool the glass sheet G. Also, the cooling units 340 that are provided in the vicinity of the opposite ends (portions on the respective sides) in the width direction and have a lower temperature than the glass sheet G cool the opposite ends (portions on the respective sides) in the width direction of the glass sheet G.

At this time, it is preferable that the opposite ends in the width direction of the glass sheet G are more rapidly cooled than the central part in the width direction of the glass sheet G, with the glass viscosity η satisfying log η=9 to 14.5. Cooling the opposite ends of the glass sheet G by the cooling rollers 30 increases the viscosity of the opposite ends, and it is thus possible to suppress shrinking of the glass sheet G in the width direction.

Note that there may be a case where the liquidus temperature of glass used for the glass sheet G is a high temperature of, for example, 1050° C. to 1250° C. In such a case, when formation is intended to be carried out by down-drawing (overflow down-drawing) as in this embodiment, the temperature of molten glass needs to be kept higher than the liquidus temperature so as not to cause devitrification. However, when the temperature of molten glass is increased, the viscosity of the molten glass tends to be low, and it is thus not possible to sufficiently carry out cooling of the opposite ends in the width direction of the glass sheet G. As a result, after molten glass leaves the forming cell 310, shrinking in the width direction readily occurs. Considering these facts, it is preferable to perform rapid cooling such that the viscosity η of the opposite ends of the glass sheet G satisfies log=9 to 14.5.

As stated above, in the annealing step carried out in the lehr 50, the temperature regulating control of the temperature regulating units 360a to 360g is executed according to the directions of the control device 550 based on the atmosphere temperature of the glass sheet G sensed by the temperature sensor unit 380.

At that time, it is preferable to control the temperature of the glass sheet G such that tensile stress acts on the central part of the glass plate G as follows.

That is, at least in the temperature range from the temperature of the annealing point of the glass sheet G plus 150° C. to the temperature of the strain point of the glass sheet G minus 200° C., the cooling rate of the central part in the width direction is higher than the cooling rate of the opposite ends in the width direction of the glass sheet G. Furthermore, the glass sheet G is shifted from a state in which the temperature of the central part in the width direction is higher than the temperature of the opposite ends in the width direction of the glass sheet G to a state in which the temperature of the central part in the width direction is lower than the temperature of the opposite ends in the width direction of the glass sheet G. Due to such a temperature change of the glass sheet G, tensile stress acts toward the downstream side in the direction in which the glass sheet G flows (the first direction). Accordingly, it is possible to suppress warpage of the glass sheet G in the first direction of the glass sheet G.

Also, it is preferable that in the annealing step includes the following step in which temperature control in the width direction of the glass sheet G is carried out, from the lower part of the forming cell 310, in a temperature range extending to a temperature lower than a temperature range that is in the vicinity of the glass strain point of the glass sheet G.

That is, it is preferable that the annealing step includes an above-glass-strain-point temperature control step including the step of controlling the temperature of the opposite ends in the width direction of the glass sheet G so as to be lower than the temperature of a central region including the central part sandwiched between the opposite ends, and controlling the temperature of the central region so as to be uniform, the step of controlling the temperature in the width direction of the glass sheet G such that the temperature decreases toward the opposite ends from the central part, and the step of controlling the temperature such that there is no temperature gradient between the central part and the opposite ends in the width direction of the glass sheet G in a temperature range in the vicinity of the strain point of the glass sheet G.

Accordingly, tensile stress acts toward the first direction on the central part of the glass sheet G, which makes it possible to suppress warpage of the glass sheet G. Furthermore, in a temperature range in the vicinity of the glass strain point of the glass sheet G, an internal strain of the glass sheet G can be suppressed by the control of the temperature distribution of the glass sheet G such that the temperature gradient between the central part and the opposite ends in the width direction of the glass sheet G is eliminated.

Also, the annealing step may include the step of controlling the temperature, from the opposite ends to the central part in the width direction of the glass sheet G, so as to be uniform in a temperature range in the vicinity of the glass strain point of the glass sheet G, and the step of controlling the temperature so as to be lower from the opposite ends to the central part in the width direction of the glass G which has the uniform temperature. By controlling the temperature of the glass sheet G in this way, in the region where the temperature of the central part in the width direction of the glass sheet G is lower than that in the vicinity of the glass strain point, tensile stress acts in the first direction on the central part in the width direction of the glass sheet G. Accordingly, it is possible to suppress warpage in the first direction of the glass sheet G.

Furthermore, the annealing step may include a first cooling step, a second cooling step, and a third cooling step.

The first cooling step is a step of cooling at a first average cooling rate until the temperature of the central part in the width direction of the glass sheet G reaches the glass annealing point.

The second cooling step is a step of cooling at a second average cooling rate until the temperature of the central part in the width direction of the glass sheet G reaches the glass strain point minus 50° C. from the glass annealing point.

The third cooling step is a step of cooling at a third average cooling rate until the temperature of the central part in the width direction of the glass sheet G reaches the glass strain point minus 200° C. from the glass strain point minus 50° C.

In this case, it is preferable that the first average cooling rate is 5.0° C./second or higher, the first average cooling rate is higher than the third average cooling rate, and the third average cooling rate is higher than the second average cooling rate. That is, the average cooling rates in order of highest to lowest are the first average cooling rate, the third average cooling rate, and the second average cooling rate. The cooling rate of the glass sheet G in the first direction affects the thermal shrinkage of the glass sheet G produced. However, in the annealing step, setting the foregoing cooling rates enables a glass sheet having a suitable degree of thermal shrinkage to be obtained while improving the amount of the glass sheet G produced.

The temperature control of the glass sheet G as described above is carried out through the temperature regulating control of the temperature regulating units $360a$ to $360g$.

Also, it is preferable that in the case were the produced glass sheet G has a total SrO and BaO content of less than 8 mass % and a glass strain point of 675° C. or higher, the average cooling rate from the glass annealing point of the glass sheet G to the temperature of glass strain point minus 50° C. in the annealing step is 0.5° C./second to lower than 0.5 to 5.5° C./second. With the total SrO and BaO content being less than 8 mass %, it is possible to suppress the weight and the coefficient of thermal expansion of the glass sheet G as an end product. Also, it is possible that glass having a glass strain point of 675° C. or higher has a small degree of thermal shrinkage. In this case, the temperature is controlled such that the average cooling rate of the glass sheet G from the glass annealing point to a temperature of glass strain point minus 50° C. is 0.5° C./second to lower than 5.5° C./second. The control of the temperature of the glass sheet G enables the degree of thermal shrinkage to be sufficiently small while ensuring the productivity of the glass sheet G. In the case where the aforementioned average cooling rate is lower than 0.5° C./second, large production equipment is required, thus impairing the productivity of the glass sheet G. On the other hand, in the case where the aforementioned average cooling rate is 5.5° C./second or higher, it is not possible to make the degree of thermal shrinkage of the end product glass sheet G small. As will be stated below, glass sheets with a small degree of thermal shrinkage are desired for, for example, flat panel displays, which are required to have high definition, using polysilicon thin film transistors (p-Si TFTs) and oxide semiconductors. For glass sheets for use in such applications, it is effective that the average cooling rate of the glass sheet G from the glass annealing point to the temperature of glass strain point minus 50° C. is 0.5 to lower than 5.5° C./second in the annealing step.

(6) Preferable configurations of glass sheet

Preferable configurations of a glass sheet produced using the glass sheet production apparatus and the glass sheet production method according to this embodiment will now be described below. Note that the glass sheet is not limited to the following configurations.

(Thickness of glass sheet)

The expected thickness of the glass sheet is 0.1 mm to 1.5 mm. Alternatively, as a glass substrate for a flat panel display, the expected thickness is 0.01 to 1.0 mm. More preferable upper limit values in order of preference are 0.4 mm, 0.5 mm, 0.8 mm, 1.0 mm, and 1.2 mm. Furthermore, preferable lower limit values in order of preference are 0.3 mm, 0.2 mm, and 0.1 mm. A light-weight and thin glass sheet is desired for, for example, a flat panel display. Accordingly, the smaller the glass sheet thickness, the more preferable. On the other hand, the smaller the glass sheet thickness, the poorer the strength of the glass sheet. For example, the smaller the glass sheet thickness, the more likely the breakage of a glass sheet in the display production process or defects during in-process transportation due to bending occur. In consideration of these facts, the thickness of a glass substrate for a flat display is preferably 0.01 to 1.0 mm, more preferably 0.1 to 0.8 mm, and even more preferably 0.2 to 0.8 mm. Here, the smaller the thickness of the glass sheet produced, the smaller the potential heat per unit area of the glass sheet G inside the forming furnace 30 and the lehr 40, and the glass sheet G is thus more susceptible to the change of atmosphere temperature inside the forming furnace 30 and the lehr 40. Therefore, internal strain, warpage, and inversion of the glass sheet G readily occur. In other words, when the thickness of the glass sheet G is 0.01 to 0.5 mm or smaller, the effect of the present invention, i.e., enabling suppression of a change of atmosphere temperature inside the forming furnace 30 and the lehr 40, is demonstrated significantly. When the thickness of the glass sheet G is 0.01 to smaller than 0.5 mm, the effect of the present invention is more significantly demonstrated, and when the thickness of the glass sheet G is 0.01 to smaller than 0.4 mm, the effect of the present invention is even more significantly demonstrated. Here, the term "inversion" means that the glass sheet G is deflected into a crescent shape in the width direction, concavity and convexity are made on the two principal surfaces on the respective sides of the flowing glass sheet G, and such concavity and convexity alternate over time, thus creating a wavy state.

(Size of glass sheet)

The expected size of the glass sheet is 500 mm to 3500 mm in the width direction and 500 mm to 3500 mm in the longitudinal direction. Note that, for a large-size glass sheet, a large glass production device is necessary. That is, when the size of the furnace 30 that includes the forming furnace 40 and the lehr 50 is increased, the furnace outside space S is accordingly increased. With an increased furnace outside space S, an upward air flow generated in the furnace outside space S also is likely to be large. That is, the larger the size of the glass sheet, the more likely the temperature of the outer surface of the furnace wall is unstable, and the temperature inside the furnace is highly likely to change. Therefore, in the case where the length in the width direction of the glass sheet is 2000 mm or greater, the effect of the present invention is demonstrated significantly. Furthermore, when the length in the width direction of the glass sheet is 2500 mm or greater or even 3000 mm or greater, the effect of the present invention is demonstrated significantly.

(Types of glass sheet)

The expected types of the glass sheet include borosilicate glass, aluminosilicate glass, aluminoborosilicate glass, soda lime glass, alkali silicate glass, alkali aluminosilicate glass, and alkali aluminogermanate glass (Internal strain of glass sheet)

The expected maximum value of internal strain (maximum value of retardation) of the glass sheet is 1.7 nm or smaller (0 to 1.7 nm) when the glass sheet has a thickness of 0.5 mm. It is preferably 1.5 nm or smaller (0 to 1.5 nm), more preferably 1.0 nm or smaller (0 to 1 nm), and even more preferably 0.7 nm or smaller (0 to 0.7 nm). Note that internal strain was measured with a birefringence measurement device manufactured by Uniopt Corporation Ltd. Here, since it is required that liquid crystal displays are assembled highly precisely, the method of this embodiment capable of reducing the plane strain of the glass sheet is particularly suitable when producing a glass sheet as a glass substrate for a liquid crystal display.

(Properties of glass sheet: degree of thermal shrinkage)

It is preferable that the glass sheet produced in this embodiment has a degree of thermal shrinkage of 110 ppm or less when left to stand in a 550° C. temperature atmosphere for 2 hours, more preferably 80 ppm or less, and even more preferably 60 ppm or less. In particular, it is preferable that a glass sheet that constitutes a p-Si TFT has a degree of thermal shrinkage of 80 ppm or less. Note that the degree of thermal shrinkage is calculated as follows: Amount of thermal shrinkage/Initial length×$10^6$ (ppm). An example of the method for measuring the degree of thermal shrinkage is as follows. 1. Give parallel guide lines to the opposite ends of a glass sheet using a diamond pen. 2. Cut the glass sheet in half perpendicularly to the guide lines, and heat-treat one (at 550° C. for 2 hours in the description provided above). 3. Compare the heat-treated glass sheet with the other glass sheet, and measure the shift amount of the guide lines of the glass sheet.

(Glass sheet: Warpage)

As for the warpage of the glass sheet, it is preferable that when measurement is carried out according to the following method, the maximum warpage value is in the range from 0 to 0.2 mm, preferably 0 to 0.15 mm, more preferably 0 to 0.1 mm, even more preferably 0 to 0.05 mm, and particularly preferably 0 to 0.05 mm. Warpage measurement includes the following steps. 1. Cut out a plurality of small pieces (square pieces having a length of about 400 mm per side) from a glass sheet. 2. Measure warpage in 4 places at the corners and 4 places in the center on both sides (that is, measure warpage in a total of 16 places) for each of the small pieces. For example, in the case where warpage of 8 small pieces is measured, warpage measurement data of 128 places (16 places×8 pieces) is obtained. 3. Check whether the maximum value of the measurement data obtained in item 2 is within the aforementioned range or not. Note that, in this embodiment, the maximum warpage value measured of the plurality of small pieces is regarded as the warpage of a glass sheet.

(Application examples of glass sheet)

The glass sheet is expected to be used for flat panel displays (liquid crystal displays, organic EL displays, plasma displays, and the like), solar cell panels, and cover glass. In recent years, highly precise liquid crystal displays and organic EL displays are desired, and the present invention, which is capable of reducing the internal strain of a glass sheet used for a liquid crystal display and an organic EL display, is particularly suitable for a glass sheet for a liquid crystal display and a glass sheet for an organic EL display. In particular, since high-definition flat panel displays for audio-visual equipment (such as portable terminals) are desired, the present invention capable of reducing internal strain is suitable. Note that the cover glass refers to a reinforced glass obtained by chemically or physically reinforcing a glass sheet, for example, to protect the display screen or the case of audio-visual equipment (such as portable terminals).

As for glass substrates for flat panel displays (such as liquid crystal displays and plasma displays), examples of the glass sheet may be those that have the following components in mass %. The values provided in the parentheses are preferable contents of the respective components, and the later the values, the more preferable.

$SiO_2$: 50 to 70% (55 to 65%, 57 to 64%, 58 to 62%),
$Al_2O_3$: 5 to 25% (10 to 20%, 12 to 18%, 15 to 18%),
$B_2O_3$: 0 to 15% (5 to 15%, 6 to 13%, 7 to 12%).

At this time, the following components may be contained as optional components.

MgO: 0 to 10% (a lower limit of 0.01%, a lower limit of 0.5%, an upper limit of 5%, an upper limit of 4%, an upper limit of 2%),
CaO: 0 to 20% (a lower limit of 1%, a lower limit of 3%, a lower limit of 4%, an upper limit of 9%, an upper limit of 8%, an upper limit of 7%, an upper limit of 6%),
SrO: 0 to 20% (a lower limit of 0.5%, a lower limit of 3%, an upper limit of 9%, an upper limit of 8%, an upper limit of 7%, an upper limit of 6%),
BaO: 0 to 10% (an upper limit of 8%, an upper limit of 3%, an upper limit of 1%, an upper limit of 0.2%),
$ZrO_2$: 0 to 10% (0 to 5%, 0 to 4%, 0 to 1%, 0 to 0.1%).

In particular, it is preferable to contain 50 to 70% of $SiO_2$, 5 to 18% of $B_2O_3$, to 25% of $Al_2O_3$, 0 to 10% of MgO, 0 to 20% of CaO, 0 to 20% of SrO, 0 to 10% of BaO, 5 to 20% of RO (provided that R refers to at least one selected from Mg, Ca, Sr, and Ba, which are all components contained in the glass sheet G). Moreover, since $R'_2O$ (provided R' refers to at least one selected from Li, Na, and K, which are all components contained in the glass sheet G) is not essential, and $R'_2O$ need not be contained. In such a case, the glass sheet is a non-alkali glass that does not substantially contain $R'_2O$, and it is possible to reduce the possibility of $R'_2O$ seeping out of the glass sheet which causes destroying a TFT. On the other hand, it is possible to create glass containing a small amount of alkali by intentionally allowing $R'_2O$ to be contained in an amount greater than 0.10 mass % and less than 2.0 mass %. In this case, while suppressing the deterioration of TFT properties and the thermal expansion of glass so as to be within specific ranges, it is possible to improve the basicity of glass and make the oxidation of metal whose valency changes easy, thus enabling enhancement of clarity. Moreover, the specific resistance of glass can be lowered, and thus such glass is suitable for carrying out electric melting in the melting furnace 201. It is more preferable to contain $R'_2O$ in a proportion greater than 0.20% and 2.0% or less (provided that R' is at least one selected from Li, Na, and K). It is preferable that a refining agent is contained in a proportion of 0.05 to 1.5% in total and none of $As_2O_3$, $Sb_2O_3$, and PbO is substantially contained. It is more preferable that the iron oxide content in glass is 0.01 to 0.2%.

By configuring the composition of glass so as to be within the aforementioned compositional ranges, it is possible to allow the glass sheet G to serve as a glass sheet that satisfies properties required of a glass substrates for a flat panel display such as a liquid crystal display or an organic EL display. More specifically, it is possible to achieve a glass sheet that satisfies a glass strain point of 650° C. or higher. Also, it is possible to achieve a glass sheet that satisfies a density of 2.6 g/cm$^3$ or less. Moreover, it is possible to achieve a glass sheet that has a Young's modulus of 70 GPa or greater. Furthermore, it is possible to achieve a glass sheet that has a liquidus temperature of 1250° C. or lower. Since it is possible to achieve a glass sheet that has a liquidus temperature of 1250° C. or lower, it is possible to use overflow down-drawing. However, since it is difficult to satisfy the aforementioned properties required of a glass substrate for a flat panel display while attaining a liquidus temperature of 1050° C. or lower, it is preferable that the liquidus temperature is 1050° C. to 1250° C.

Also, examples of the glass sheet applicable after receiving chemical strengthening to a glass sheet for a cover glass or a solar cell include glass sheets having the following components in mass %.

$SiO_2$: 50 to 70% (55 to 65%, 57 to 64%, 57 to 62%),
$Al_2O_3$: 5 to 20% (9 to 18%, 12 to 17%), and
$Na_2O$: 6 to 30% (7 to 20%, 8 to 18%, 10 to 15%).

At this time, the following components may be contained as optional components.

Li$_2$O: 0 to 8% (0 to 6%, 0 to 2%, 0 to 0.6%, 0 to 0.4%, 0 to 0.2%),

B$_2$O$_3$: 0 to 5% (0 to 2%, 0 to 1%, 0 to 0.8%),

K$_2$O: 0 to 10% (a lower limit of 1%, a lower limit of 2%, an upper limit of 6%, an upper limit of 5%, and an upper limit of 4%), MgO: 0 to 10% (a lower limit of 1%, a lower limit of 2%, a lower limit of 3%, a lower limit of 4%, an upper limit of 9%, an upper limit of 8%, and an upper limit of 7%), CaO: 0 to 20% (a lower limit of 0.1%, a lower limit of 1%, a lower limit of 2%, an upper limit of 10%, an upper limit of 5%, an upper limit of 4%, and an upper limit of 3%), ZrO$_2$: 0 to 10% (0 to 5%, 0 to 4%, 0 to 1%, 0 to 0.1%).

In particular, as for chemically strengthened cover glasses and glass substrates for solar cells, it is preferable that they contain:

SiO$_2$: 50 to 70 mass %,
Al$_2$O$_3$: 5 to 20 mass %,
Na$_2$O: 6 to 30 mass %,
K$_2$O: 0 to 10 mass %,
MgO: 0 to 10 mass %,
CaO: 0 to 20 mass %.

Furthermore, in recent years, in order to achieve assembly of more high-definition flat panel displays, flat panel displays that use, instead of an α-Si thin film transistor (TFT), a p-Si (low-temperature polysilicon) TFT or an oxide semiconductor are desired. In the production process of a flat panel in which a p-Si TFT or an oxide semiconductor is used, there is a higher-temperature heat treatment step than in the production process of a flat panel in which an α-Si TFT is used. Accordingly, the degree of thermal shrinkage of the glass sheet for which a p-Si TFT or an oxide semiconductor is required to be a small. To reduce the degree of thermal shrinkage, it is preferable to raise annealing conditions of the glass sheet and the glass strain point. In particular, for a p-Si TFT and an oxide semiconductor, a glass sheet having a glass strain point of 675° C. or higher (a glass strain point of 675° C. to 750° C.) is preferable, a glass sheet having a glass strain point of 680° C. or higher (a glass strain point of 680° C. to 750° C.) is more preferable, and a glass sheet having a glass strain point of 690° C. or higher (a glass strain point of 690° C. to 750° C.) is particularly preferable.

As for the composition of a glass sheet having a glass strain point of 675° C. or higher, examples include glass sheets having the following components in mass %.

SiO$_2$: 52 to 78 mass %,
Al$_2$O$_3$: 3 to 25 mass %,
B$_2$O$_3$: 3 to 15 mass %, and RO (provided that RO is the total amount of the components out of MgO, CaO, SrO, and BaO contained in the glass sheet): 3 to 20 mass %,
with the mass ratio (SiO$_2$+Al$_2$O$_3$)/B$_2$O$_3$ being 7 to 20.

In this case, it is preferable in terms of reducing weight and the coefficient of thermal expansion that the total SrO and BaO content is lower than 8 mass %. The total SrO and BaO content is preferably 0 to 7 mass %, more preferably 0 to 5 mass %, even more preferably 0 to 3 mass %, and still more preferably 0 to 1 mass %. In particular, in the case where the density of the glass sheet G is to be lowered, it is preferable that neither SrO nor BaO is substantially contained. The phrase "not substantially contained" means that neither SrO nor BaO is intentionally added, and the phrase does not exclude the possibility that SrO and BaO may be inadvertently contained as impurities.

Moreover, to raise the glass strain point, it is preferable that the mass ratio (SiO$_2$+Al$_2$O$_3$)/RO is 7.5 or greater. To raise the glass strain point, it is preferable to set the β-OH value to 0.1 to 0.3 [mm$^{-1}$]. On the other hand, not to allow an electric current to flow into the melting furnace 201 but into molten glass when melting, it is preferable in terms of lowering the specific resistance of glass that the glass sheet contains R$_2$O (provided that R$_2$O is the total amount of the all components contained in the glass sheet out of Li$_2$O, Na$_2$O, and K$_2$O) in a proportion of 0.01 to 0.8 mass %. Alternatively, to lower the specific resistance of glass, it is preferable to contain Fe$_2$O$_3$ in a proportion of 0.01 to 1 mass %. Moreover, it is preferable that the glass sheet has CaO/RO of 0.65 or greater to prevent an increase of the liquidus temperature while achieving a high glass strain point. Configuring the liquidus temperature so as to be 1250° C. or lower enables overflow down-drawing to be applicable. In light of applications to mobile devices such as mobile communication terminals, it is preferable in terms of reducing weight that the total SrO and BaO content is 0 mass % or higher and 2 mass % or lower.

(Components)

SiO$_2$ is a component that serves as the frame work of glass of a glass sheet, and has an effect of enhancing the chemical durability and the heat resistance of glass. In the case where the SiO$_2$ content is excessively low, the effect on chemical durability and heat resistance is not sufficiently obtained, and in the case of an excessively large SiO$_2$ content, glass readily undergoes devitrification, thus making formation difficult, and the viscosity increases, thus making homogenization of the glass difficult, Al$_2$O$_3$ is a component that serves as the backbone of glass and improves the heat resistance of glass, or in other words, it raises the strain point. Also, it has an effect of raising the etching rate. With an excessively low Al$_2$O$_3$ content, the effect of glass is not sufficiently acquired. On the other hand, an excessively high Al$_2$O$_3$ content raises the viscosity of glass and makes melting difficult, thus impairing acid resistance.

B$_2$O$_3$ is a component that lowers the viscosity of glass and promotes melting and clarification of glass. An excessively low B$_2$O$_3$ content reduces the acid resistance of glass, thus making homogenization of the glass difficult. However, an excessively high B$_2$O$_3$ content lowers the strain point.

MgO and CaO are components that lower the viscosity of glass and promote the melting and the clarification of glass. Also, since the proportion required to raise the density of glass is small among alkaline earth metals, Mg and Ca are components that are advantageous for improving meltability while reducing the weight of the resulting glass. However, excessively large MgO and CaO contents impair the chemical resistance of glass.

SrO and BaO are components that lower the viscosity of glass and promote the melting and the clarification of glass. They are also components that improve the oxidizability of glass raw materials and thus improve clarity. However, excessively large SrO and BaO contents increase the density of glass, thus making it not possible to reduce the weight of the glass sheet, and reduce the chemical durability of glass.

Li$_2$O is a component that reduces the viscosity of glass and thus improves the meltability and the formability of glass. Li$_2$O is also a component that improves the Young's modulus of glass. However, when the Li$_2$O content is excessively high, glass readily devitrifies, thus making it difficult to apply down-drawing. Also, the strain point is decreased.

Na$_2$O and K$_2$O are components that reduce the high-temperature viscosity of glass and improve the meltability and the formability of glass. Na$_2$O and K$_2$O are also components that improve the anti-devitrification characteristics of glass. Excessively low Na$_2$O and K$_2$O contents reduce the meltability of glass, resulting in an increased cost of melting. Furthermore, excessively low Na$_2$O and K$_2$O cause the glass readily devitrifies, and the anti-devitrification characteristics also degrade, thus making it difficult to apply overflow down-drawing. On the other hand, when the Na$_2$O and K$_2$O contents are excessively high, deterioration of anti-devitrification characteristics also occurs due to the impaired glass balance.

Note that Li$_2$O, Na$_2$O, and K$_2$O are components that may deteriorate TFT characteristics by seeping from glass and that may increase the coefficient of thermal expansion of glass and break the substrate during heat treatment, in the case where the glass sheet is applied to a glass substrate for a flat panel display (such as a glass substrate for a liquid crystal display or a glass substrate for an organic EL display). Accordingly, it is not preferable to contain large amounts of Li$_2$O, Na$_2$O, and K$_2$O. The total amount thereof should be limited to 2.0% or less, and it is preferable in view of, for example, breakage of TFT that none of Li$_2$O, Na$_2$O, and K$_2$O is substantially contained. However, by intentionally allowing the foregoing components to be contained in glass in specific amounts, it is possible to, while suppressing the deterioration of TFT properties and making the thermal expansion of glass be within a specific range, improve the basicity of glass and make the oxidation of metal whose valency changes easy, thus enabling clarity to be demonstrated. Accordingly, as for a glass substrate for a flat panel display (such as a glass substrate for a liquid crystal display or a glass substrate for an organic EL display), the alkali metal oxide (total amount of all the components contained in the glass sheet out of Li$_2$O, Na$_2$O, and K$_2$O) content is preferably higher than 0.05 mass % to 2.0 mass % or lower, more preferably higher than 0.1 mass % to 2.0 mass % or lower, and even more preferably higher than 0.1 mass % to 1.0 mass % or lower.

ZrO$_2$ is a component that raises the strain point and the viscosity of glass in the vicinity of the liquidus temperature. However, an excessively high ZrO$_2$ content raises the liquidus temperature and impairs the anti-devitrification characteristics.

TiO$_2$ is a component that lowers the high-temperature viscosity of glass. However, an excessively high TiO$_2$ content impairs the anti-devitrification characteristics. Furthermore, the glass becomes stained, and thus is not preferable for application to, for example, a cover glass of a display surface of an electronic device. Also, staining of the glass causes a reduction in ultraviolet light transmittance, and therefore in the case of performing processing using an ultraviolet curable resin, there is the disadvantage that the ultraviolet curable resin cannot be sufficiently cured.

To the glass of the glass sheet, a refining agent can be added as a component that removes air bubbles in the glass. The refining agent is not particularly limited as long as it is unlikely to exert an environmental impact and demonstrates an excellent refining effect on the glass, and an example may be at least one member selected from metal oxides such as tin oxide, iron oxide, cerium oxide, terbium oxide, molybdenum oxide, and tungstic oxide. Meanwhile, with regard to bubble, there are particularly rigorous requirements on glass substrates for flat panel displays such as liquid crystal displays and organic EL displays. Therefore, it is preferable that a refining agent contains at least tin oxide, which has a particularly high level of refining effect, among metal oxides such as tin oxide, iron oxide, cerium oxide, terbium oxide, molybdenum oxide, and tungstic oxide.

Note that As$_2$O$_3$, Sb$_2$O$_3$, and PbO are substances that cause a reaction accompanied by a valency change in molten glass and has a glass refining effect, but since As$_2$O$_3$, Sb$_2$O$_3$, and PbO are substances with a large environmental impact, none of As$_2$O$_3$, Sb$_2$O$_3$, and PbO is substantially contained in a glass sheet 10 of this embodiment. The phrase "none of As$_2$O$_3$, Sb$_2$O$_3$, and PbO is substantially contained" as used herein means that the content is less than 0.01 mass % and they are not intentionally contained except for being present as impurities.

(7) Features (7-1)

In this embodiment, air pressure control (air pressure control step) is carried out on the furnace outside space S. The furnace outside space S is formed between the furnace 30 and the inner wall (corresponding to the covering part) of the housing B that covers the furnace 30. The furnace 30 includes the forming furnace 40 and the lehr 50. Specifically, the furnace outside space S is divided into a plurality of spaces (4 spaces in this embodiment, i.e., S1, S2, S3, and S4). In the air pressure control, the furnace outside space S is pressurized by fans 421, 422, 423, and 424 such that the air pressure of the furnace outside space S is higher toward the upstream side in the first direction. While carrying out the air pressure control on the furnace outside space S, the glass sheet G is formed in the forming furnace 40 (forming step ST5), and the glass sheet G is annealed in the lehr 50 (annealing step ST6). The air pressure control is executed by the control device 500.

In this embodiment, first, the furnace outside space S is pressurized such that the air pressure of the furnace outside space S is higher toward the upstream side of the first direction, and it is thus possible to suppress leakage of air inside the furnace 30 into the furnace outside space S. Accordingly, it is possible to suppress generation of an upward air flow that ascends along the surface of the glass sheet G and suppress a change of the temperature inside the furnace 30. Also, suppressing generation of an upward current that ascends along the surface of the glass sheet G enables inversion of the glass sheet G to be suppressed. Suppressing a change of the temperature inside the furnace 30 or suppressing inversion of the glass sheet G enables a temperature profile in the width direction and the flow direction of the glass sheet G to be controlled sufficiently precisely. Accordingly, it is possible to reduce the warpage, the internal strain, and the thermal shrinkage of the glass sheet.

In this embodiment, first, the furnace outside space S is pressurized, and it is thus possible to suppress leakage of air inside the furnace 30 into the furnace outside space S. Accordingly, it is possible to suppress generation of an upward air flow that ascends along the surface of the glass sheet G and suppress a change of the temperature inside the furnace 30.

Here, it seems that not only an upward air flow that ascends along the surface of the glass sheet is generated but also an upward air flow is generated along the outer surface of the furnace wall of the furnace. It is expected that when an upward air flow is generated along the outer surface of the furnace wall of the furnace, the temperature of the outer surface of the furnace wall and thus the temperature of the inner surface are changed. In such a case, there is a concern that it may lead to a change of the temperature inside the furnace. In such a case, there is a concern that the quality of the resulting glass sheet may be affected.

It seems that in one case the upward air flow that ascends along the surface of the glass sheet is generated due to the chimney effect and in another case it is generated by a convection air flow created when gas in a high-temperature region enters a low-temperature region. Here, since it is difficult to completely remove interstices of the furnace wall, an upward air flow is generated due to the aforementioned chimney effect. Note that the upward air flow is readily generated in a region where there are large interspaces between members including such as rollers provided in the furnace. Meanwhile, in the case where down-drawing is used, the region in the central part of the glass sheet which will become a product is formed and annealed without contacting such members. That is, no member comes into contact in the vicinity of the region in the central part of the glass sheet which will become a product, and the interspaces of such members are large, and accordingly an upward air flow is readily generated.

When the air pressure of the furnace outside space is excessively smaller than the air pressure inside the furnace 30, air readily flows out of the furnace inside space into the furnace outside space. When the amount of air that flows out of the space inside the furnace 30 is increased, an upward air flow along the glass sheet G is readily generated due to the chimney effect.

Also, since the upward air flow is not generated in a constant manner, the volume of upward air flow that ascends along the glass sheet G is often not uniform on the principal surface on each side of the glass sheet G. For example, in the case where the volume of upward air flow that ascends along the principal surface (front surface) on the front side of the glass sheet G is larger than the volume of upward air flow that ascends along the principal surface (back surface) on the back side of the glass sheet G, the extent of cooling of the front surface of the glass sheet G is larger than that of the back surface, and the shrinkage of the front surface of the glass sheet G is greater than that of the back surface. In this case, deformation in a crescent shape such that the back surface side of the glass sheet G serves as a convex part. Note that, as stated above, since the upward air flow is not generated in a constant manner, the volume of upward air flow along the front surface of the glass sheet G and the volume of upward air flow along the back surface of the glass sheet G change over time, and the glass sheet G is inverted. Generation of inversion of glass makes it difficult to achieve the temperature profile of the glass sheet G to reduce internal strain or warpage, and as a result, internal strain or warpage is generated.

On the other hand, it is difficult to completely remove interstices in the inner wall of the housing. Therefore, it seems that an upward air flow is also generated in the furnace outside space due to the chimney effect. Note that since the atmosphere temperature is higher closer to the furnace wall, an upward air flow is readily generated. Also, gas in a high-temperature region flowing into a low-temperature region creates a convection air flow. This seems to be because the atmosphere temperature on the inner wall side of the housing is lower than that on the furnace wall side. That is, a downward air flow is generated along the inner wall of the housing, and an upward air flow is generated along the furnace wall, thus creating a large convection air flow.

On the other hand, in this embodiment, the furnace outside space S is pressurized such that the air pressure of the furnace outside space S is higher toward the upstream side of the first direction, and it is thus possible to suppress an upward air flow that is generated along the glass sheet G and suppress a change of the temperature of the space inside the furnace 30. Also, in this embodiment, it is thus possible to suppress a flow of air that ascends along the outer surface of the furnace wall of the furnace 30 in the furnace outside space S by increasing the air pressure of the furnace outside space S toward the upstream side. Accordingly, the temperature of the outer surface of the furnace wall of the furnace 30 can be stabilized as much as possible. Therefore, a change of the temperature inside the furnace 30 can be further suppressed.

Note that it is preferable to control the air pressure of the space inside the furnace 30 higher at a higher position toward the upstream side. Accordingly, it is possible to prevent air on the downstream side in the space inside the furnace 30 from flowing up toward the upstream side and suppress generation of an upward air flow along the glass sheet G. As stated above, in the case where the air pressure of the space inside the furnace 30 is higher at the higher position toward the upstream side and the air pressure of the furnace outside space S is assumed to be uniform, the difference between the air pressures of the space inside the furnace 30 and the furnace outside space S is larger at a higher position toward the upstream side of the space inside the furnace 30. Then, air readily flows into the furnace outside space S from the space inside the furnace 30. That is, as in this embodiment, by controlling the air pressure of the furnace outside space S higher at the higher position toward the upstream side, it is possible to suppress a flow of air into the furnace outside space S from the space inside the furnace 30 (for example, the space S1 or the space S2) on the upstream side, even in the case where the air pressure is controlled such that the air pressure of the space inside the furnace 30 is higher toward the upstream side.

Also, in this embodiment, the atmosphere temperature of the glass sheet G is regulated by the temperature regulating units 360a to 360g in the annealing step ST6 so as to suppress the internal strain of the glass sheet. That is, the temperature of the glass sheet G is indirectly controlled by the temperature regulating units 360a to 360g.

The embodiment achieves a change of the temperature inside the furnace 30 to be suppressed, whereby the temperature of the glass sheet G can be controlled precisely. Therefore, a temperature profile of the glass sheet with which internal strain, warpage, and the degree of thermal shrinkage are suppressed can be achieved, and it is thus possible to suppress the internal strain, the warpage, and the degree of thermal shrinkage of the glass sheet, and improve the quality of the glass sheet. Also, such a glass sheet can be obtained as stably as possible.

Also, for example, the air pressure of the furnace outside space S is regulated such that the air pressure of the furnace outside space S is lower than the air pressure of a position at the same height position as that in the space inside the furnace 30, and it is thus possible to suppress a flow of air into the space inside furnace 30 from the furnace outside space S through small interstices in the furnace wall, thus making it possible to suppress a change of the temperature inside the furnace 30.

In particular, in the lehr inside space S8 (see FIG. 6), the glass sheet G travels through a temperature range from the glass annealing point to the glass strain point as well as a temperature range from the glass strain point to a temperature below the glass strain point. Therefore the temperature profile of the glass sheet in the lehr inside space S8 greatly affects the internal strain, the warpage, and the degree of thermal shrinkage of the glass sheet G. Accordingly, flow of cool air from the furnace outside space S to the space inside the furnace 30 is not desirable, where the temperature of the air in the furnace outside space S is lower than in the space inside the furnace 30. In this respect, this embodiment that can suppress a flow of air from the furnace outside space S to the space inside the furnace 30 is suitable. In particular, it is desired that a glass substrate for a flat panel display, such as a glass substrate on which a p-Si TFT is formed, reduces thermal shrinkage and suppresses non-uniform thermal shrinkage. The glass sheet produced by this embodiment that has a small degree of thermal shrinkage and is capable of suppressing non-uniformity in the degree of thermal shrinkage can be suitably used for the aforementioned glass substrate for a flat panel display.

(7-2)

In this embodiment, the floors 411, 412, and 413 that serve as dividing members for dividing the furnace outside space S into a plurality of spaces (four spaces S1, S2, S3, and S4 in this embodiment) are disposed in the furnace outside space S.

Here, the floors 411, 412, and 413 make it easy to divide the furnace outside space S into a plurality of spaces. That is, the floors make it easy to carry out the air pressure control.

(7-3)

In this embodiment, the furnace outside space S is divided into an upper forming furnace outside space S1, a lower forming furnace outside space S2, a lehr outside space S3, and a lower lehr outside space S4. The difference of temperature in the upper forming furnace outside space S1, the lower forming furnace outside space S2, the lehr outside space S3, and the lower lehr outside space S4 is smaller in the first direction than that in the furnace outside space S.

Therefore, even when a flow of air that ascends along the outer wall of the furnace 30 is generated, the range of the flow of air that ascends along the outer surface of the furnace wall of the furnace 30 can be narrow (that is, the flow of air can be confined within each of the spaces S1 to S4). That is, the furnace outside space S is divided into a plurality of spaces, and the air pressure is configured so as to be increased toward the upstream side, and it is thus possible to suppress generation of a large flow of air that ascends across a plurality of spaces (for example, a flow of air that travels across at least two or more spaces of the spaces S1 to S4). Accordingly, the temperature of the outer surface of the furnace wall of the furnace 30 is more stabilized. Therefore, the influence on the temperature inside the furnace 30 can be reduced, and the temperature inside the furnace 30 can be more stabilized. It is possible to make the temperature inside the furnace 30 as stable as possible, and it is thus possible to precisely control the temperature of the glass sheet G. Accordingly, it is possible to suppress the internal strain of the glass sheet and improve the quality of the glass sheet.

(7-4)

In this embodiment, the lehr outside space S3 is a space such that the atmosphere temperature of the glass sheet G flowing in the lehr inside space S8 that is at the same height position as the lehr outside space S3 (i.e., that corresponds to the distance from the bottom surface of the floor 412 to the top surface of the floor 413) is at, for example, 800° C. to 110° C. Alternatively, the lehr outside space S3 is a space such that a region where the glass sheet G flowing through the lehr inside space S8 has a temperature between annealing point+5° C. and strain point−50° C. is included. That is, in the lehr inside space S8, the annealing step ST6, which is an important step relevant to the quality of a glass sheet, is carried out. Therefore, it is desirable that the temperatures of the lehr outside space S3 is even more stable than the other spaces S1, S2, and S4.

In this embodiment, as stated above, in the lehr outside space S3, which is an outside space at the same height position as the lehr inside space S8 where the annealing step ST6 is carried out, the temperature of the outer surface of the furnace wall of the lehr 50 can be stabilized as much as possible. Therefore, it is possible to suppress a change of the temperature of the lehr inside space S8 and thus improve the quality of a glass sheet.

(7-5)

In the air pressure control of this embodiment, the air pressure of the lower lehr outside space S4 having the lowest air pressure in the furnace outside space S is controlled so as to be higher than atmospheric pressure. Accordingly, outside air around the housing B is unlikely to flow into the housing B. It is thus possible that the furnace outside space S is unlikely to be influenced by outside air. Therefore, the quality of a glass sheet can be retained.

(8) Modification Examples

So far, an embodiment has been described with reference to the drawings, but the present invention is not limited to the foregoing embodiment, and specific configurations can be modified without departing from the scope of the present invention.

(8-1) Modification Example 1A

Figure 7:
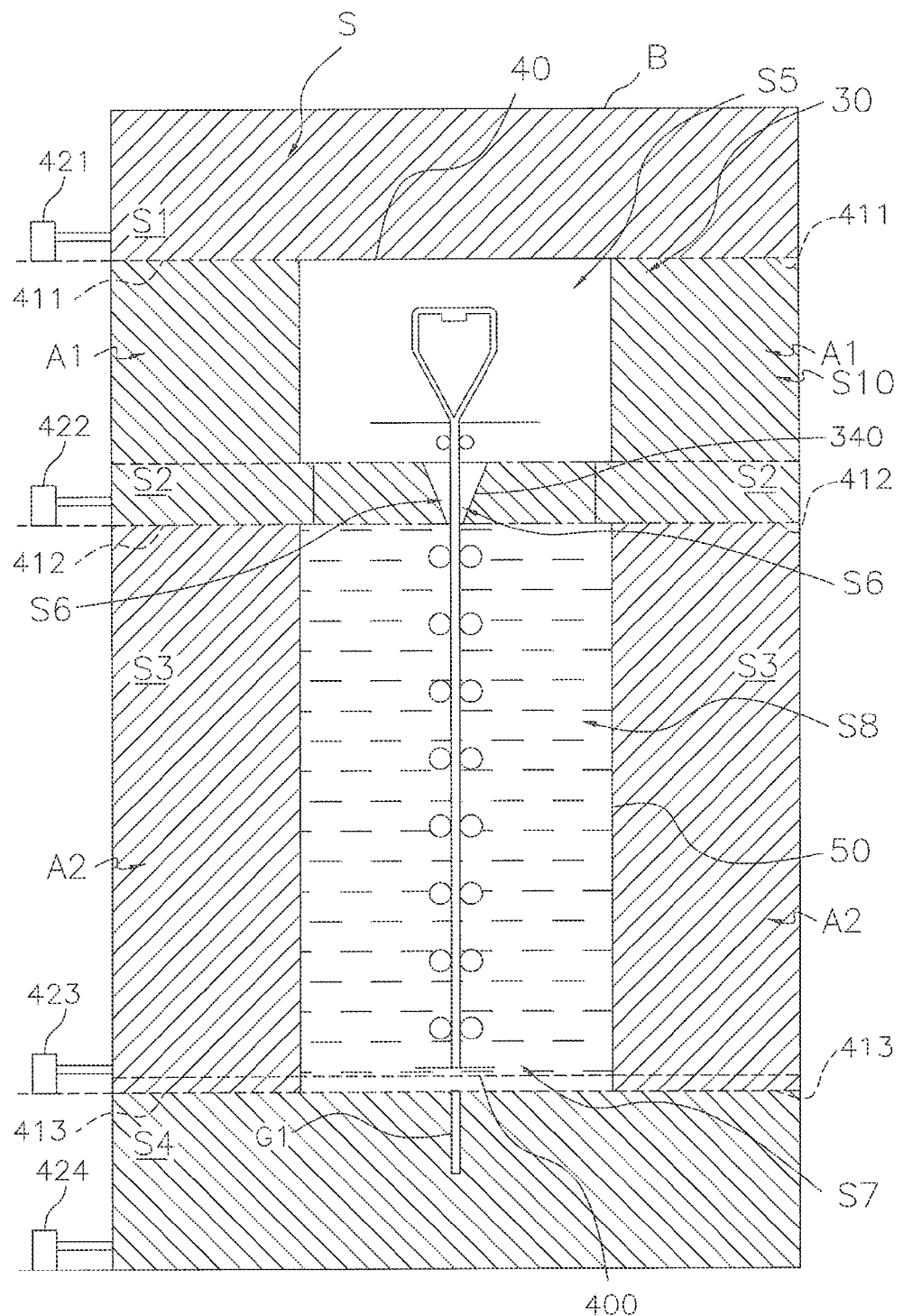
FIG. 7 is a schematic view depicting the inside space of the housing to depict the furnace outside space according to Modification Example 1A.

FIG. 7 is a schematic view depicting the inner space of the housing B to depict the furnace outside space S according to this modification example 1A.

In the foregoing embodiment, it was described that the furnace outside space S is divided into the upper forming furnace outside space S1, the lower forming furnace outside space S2, the lehr outside space S3, and the lower lehr outside space S4, and the air pressure is controlled so as to be higher toward the upstream side in those four spaces.

However, the present invention is not limited thereto, and the furnace outside space S may be divided into three spaces of the lehr outside space S3, the lower lehr outside space S4, and a forming furnace outside space S10 including the upper forming furnace outside space S1 and the lower forming furnace outside space S2. Even in this case, the same effect as the effect described above can be demonstrated.

Also, the furnace outside space S may be divided into an upper space located above and a lower space located on the downstream side (below) relative to the upper space in the first direction, and the air pressure control may be carried out only in the upper space such that the air pressure is higher toward the upstream side.

Note that, at that time, the upper space may be divided into three spaces of the upper forming furnace outside space S1, the lower forming furnace outside space S2, and the lehr outside space S3, or may be divided into two spaces of the lehr outside space S3 and the forming furnace outside space S10 including the upper forming furnace outside space S1 and the lower forming furnace outside space S2.

Note that, in those cases, the lehr outside space S3 and the lower lehr outside space S4 are controlled so as to have the same air pressure.

Here, the difference between the temperatures of the furnace wall of the forming furnace and the furnace wall of the lehr is particularly large. Therefore, a larger upward air flow is readily generated in the forming furnace outside space, the lower forming furnace outside space, the forming furnace inside space, and the lehr inside space. However, in order to improve the quality of a glass sheet, it is preferable that the temperature change in the forming furnace inside space and in the lehr inside space is small.

Accordingly, the air pressure control may be carried out only in the forming furnace outside space S10 (or the lower forming furnace outside space S2) and the lehr outside space S3 that are spaces where an upward air flow is especially readily generated and are important for maintaining the quality of a glass sheet. Specifically, the air pressure control is carried out such that the air pressure of the forming furnace outside space S10 is higher than that of the lehr outside space S3, or the air pressure control is carried out such that the air pressure of the lower forming furnace outside space S2 is higher than the air pressure of the lehr outside space S3.

Accordingly, it is possible in those spaces to suppress generation of an upward air flow and effectively maintain the quality of a glass sheet.

Also, suppression of a temperature change in the forming furnace 40 enables suppression of non-uniformity in sheet thickness or the like. Also, in the lehr 50, in a region where the temperature of a glass sheet is equal to or higher than the annealing point, suppression of a temperature change of the furnace atmosphere enables suppression of deformation of the glass sheet. Also, in the lehr 50, in a region where the temperature of a glass sheet is at the annealing point to the vicinity of the strain point, suppression of a temperature change of the furnace atmosphere enables suppression of generation of the internal strain of the glass sheet. Moreover, in the lehr 50, in a region where the temperature of a glass sheet is equal to or lower than the strain point, suppression of a temperature change of the furnace atmosphere enables suppression of the warpage of the glass sheet or the like.

(8-2) Modification Example 1B

In the foregoing embodiment, the three floors 411, 412, and 413, which serve as dividing members, are disposed, but the present invention is not limited thereto.

In the foregoing embodiment, by disposing physically separating members, a plurality of spaces can be formed easily to control the air pressure, but as long as the air pressure control is carried out such that the air pressure is higher toward the upstream side of the first direction, the same effect as the effect described above is demonstrated.

Note that even in the case where the floors are disposed, there may be a case where there are gaps between, for example, a plurality of spaces divided by the floors through which the spaces are in communication with each other. Specifically, in order to make the furnace 30 movable, floors and the furnace 30 are often not connected to each other, and in such a case, interstices through which spaces are in communication are present between the plurality of spaces divided by the floors. Accordingly, in the case where this embodiment is not applied, air flows out from a space on the downstream side toward a space on the upstream side through the interstices, and an upward air flow along the outer wall of the furnace 30 is generated.

However, even in such a case, the same effect as the effect described above is demonstrated. That is, in this embodiment, because the air pressure is controlled so as to be higher toward the upstream side of the first direction, air flowing into a space on the upstream side from a space on the downstream side in the first direction can be suppressed, thereby enabling the temperature of the outer surface of the furnace wall of the furnace 30 to be more stabilized and a change of the temperature inside the furnace 30 to be suppressed.

(8-3) Modification Example 1C

In the foregoing embodiment, the furnace outside space S was described as being divided into four spaces S1, S2, S3, and S4. However, the number of spaces the furnace outside space S is divided into is not limited thereto, and it is sufficient that the space S is divided into a plurality of spaces. Note that the more divided the furnace outside space S is, the smaller the flow of air ascending along the outer surface of the furnace wall of the furnace 30 can be, and it is thus possible to further suppress a change of the temperature inside the furnace 30.

(8-4) Modification Example 1D

In addition to the foregoing embodiment, it is possible that the lehr outside space S3 is divided into a plurality of spaces and the air pressure control is carried out such that the air pressure is higher toward the upstream side. Accordingly, it is thus possible to more effectively suppress generation of the internal strain of a glass sheet and deformation of the glass sheet. Note that, at this time, the space is not necessarily needed to be physically divided by floors or the like.

(8-5) Modification Example 1E

In the foregoing embodiment, in order to carry the above-described air pressure control, the fans 421, 422, 423, and 424 were described as being disposed on the outside of the upper forming furnace outside space S1, the lower forming furnace outside space S2, the lehr outside space S3, and the lower lehr outside space S4 to pressurize the respective spaces. However, a method for carrying out the air pressure control is not limited to those that blow air, and a method in which air-blowing and air-discharging are used in combination, a method in which the pressure difference is adjusted by a damper or the like, and a like method are applicable.

(8-6) Modification Example 1F

In the foregoing embodiment, the furnace outside space S is pressurized. However, the air pressure of the furnace outside space S is not necessarily needed to be higher than that of the space inside furnace 30. For example, making the difference of air pressures between the space inside the furnace 30 and the furnace outside space S small can reduce the amount of air leaking from the space inside the furnace 30, and it is thus possible to suppress an upward air flow generated along the glass sheet G (8-7) Modification Example 1G In the foregoing embodiment, the glass sheet G was described as being formed by overflow down-drawing, but the present invention is not limited thereto, and down-drawing is sufficient.

(8-9) Modification Example 1H

In this modification example, in the annealing step, the glass sheet may have tensile stress acting thereon in the first direction in a temperature range where the temperature is equal to or higher than the glass transition point and equal to or lower than the glass softening point of the glass sheet G. In order to avoid generating plastic deformation in an adjacent region that is adjacent to a sandwiched portion between the feed rollers 350a to 350h of the glass sheet G on the inner side in the width direction, the tensile stress may act in the adjacent region.

Also, the drive of the feed rollers 350a to 350h that draw down the glass sheet G are controlled by the control device 500 such that the peripheral speed of rollers disposed on the downstream side in the first direction is equal to or higher than the peripheral speed of rollers disposed on the upstream side of the direction in which the glass sheet G flows. Accordingly, tensile stress is always applied to the glass sheet G toward the downstream side in the first direction, thus making it possible to prevent warpage of the glass sheet G. Also, it is thus possible that tensile stress is allowed to act on the glass sheet G in the first direction in a temperature region in which the temperature of the aforementioned adjacent region is equal to or higher than the glass transition point and equal to or lower than the glass softening point of the glass sheet G.

In particular, it is more effective that the peripheral speed of feed rollers is controlled on the downstream side relative to the position where the temperature of the glass sheet G is at the glass annealing point faster than the peripheral speed of feed rollers disposed in a temperature range where the temperature of the glass sheet G is equal to or higher than the glass transition point and equal to or lower than the glass softening point in order to suppress plastic deformation of the glass sheet G. Also, in particular, it is more effective that the peripheral speed of feed rollers is controlled on the downstream side relative to the position where the temperature of the aforementioned adjacent region is at the glass annealing point faster than the peripheral speed of feed rollers disposed in a temperature range where the temperature of the adjacent region is equal to or higher than the glass transition point and equal to or lower than the glass softening point in order to suppress plastic deformation of the adjacent region.

EXAMPLES

Hereinafter, examples of the present invention will now be described.

Glass raw materials were melted to give molten glass, and clarified and stirred. The molten glass was then supplied to a forming device and formed into a glass sheet G by overflow down-drawing. Thereafter, the glass sheet G was cut to produce a glass sheet having a length of 1100 mm, a width of 1300 mm, and a thickness of 0.5 mm. At this time, the air pressure of the furnace outside space S was controlled so as to be higher toward the upstream side as depicted in table 1 below. The content of each component contained in the molten glass is as follows.

$SiO_2$ 60%
$Al_2O_3$ 19.5%
$B_2O_3$ 10%
$CaO$ 5%
$SrO$ 5%
$SnO_2$ 0.5%

At this time, the maximum strain (maximum retardation value) of the glass sheets produced in Examples 1 to 5 was 1.6 nm or less. Also, the warpage of the glass sheets was 0.18 mm or less. In particular, the maximum strain (maximum retardation value) of the glass sheets produced in Examples 2 to 4 was 1.0 nm or less. Also, the warpage of the glass sheets was 0.15 mm or less.

In contrast, as Comparative Example 1, a glass sheet of the same size was produced without carrying out air pressure control. The content of each component of the molten glass at this time was the same as above. At this time, the maximum stress (maximum retardation value) of the resulting glass sheet was 1.8 nm. Also, the warpage of the glass sheet exceeded 0.2 mm. Moreover, as Comparative Example 2, a glass sheet was produced in the same manner as in the Examples except that the air pressure of the furnace outside space S was uniform. At this time, the maximum stress (maximum retardation value) of the resulting glass sheet was 1.8 nm. Also, the warpage of the glass sheet exceeded 0.2 mm.

P1: Air pressure of the upper forming furnace outside space S1 [Pa]
P2: Air pressure of the lower forming furnace outside space S2 [Pa]
P3: Air pressure of the lehr outside space S3 [Pa]
P4: Air pressure of the lower lehr outside space S4 [Pa]

TABLE 1

|  | Ex. 1 | Ex. 2 | Ex. 3 | Ex. 4 | Ex. 5 | Comp. Ex. 1 | Comp. Ex. 2 |
| --- | --- | --- | --- | --- | --- | --- | --- |
| P1 minus atmospheric pressure [Pa] | 6.5 | 11 | 20 | 50 | 100 | Not controlled | 0 |
| P2 minus atmospheric pressure [Pa] | 6 | 9 | 17 | 27 | 60 | Not controlled | 0 |
| P3 minus atmospheric pressure [Pa] | 5.5 | 7 | 10 | 20 | 50 | Not controlled | 0 |
| P4 minus atmospheric pressure [Pa] | 5 | 5 | 8 | 15 | 40 | Not controlled | 0 |
| Maximum strain (nm) | 1.5 | less than 1.0 | less than 1.0 | less than 1.0 | 1.6 | 1.8 | 1.8 |
| Warpage (mm) | 0.16 | less than 0.15 | less than 0.15 | less than 0.15 | 0.18 | Greater than 0.2 | Greater than 0.2 |

Therefore, the present invention is useful for improving the quality of a glass sheet.

INDUSTRIAL APPLICABILITY

The present invention is widely applicable to glass sheet production methods and production apparatuses that produce glass sheets using down-drawing.

DESCRIPTION OF REFERENCE NUMERALS

10 Inner surface part of housing (covering part)
30 Furnace
40 Forming Furnace
50 Lehr
110 Produced glass sheet
411, 412, 413 Floors (dividing members)
500 Control device (controlling part)
B Housing
G Formed glass sheet
S Furnace outside space
S1 Upper forming furnace outside space (forming furnace outside space)
S2 Lower forming furnace outside space (forming furnace outside space)
S3 Lehr outside space
S4 Lower lehr outside space (lower space)

The invention claimed is:

1. A method for producing a glass sheet by down-drawing, the method comprising:
   an air pressure controlling step of controlling an air pressure of a furnace outside space formed between a furnace wall covering a whole furnace and a covering part that covers the whole furnace wall, the furnace including a forming furnace, a lehr, and a space that contains a cutting device for cutting the glass,
   a melting step of melting glass raw materials to form molten glass,
   a supplying step of supplying the molten glass to a forming cell disposed inside the forming furnace,
   a forming step of forming a glass sheet by allowing the molten glass to flow down the forming cell,
   an annealing step of cooling the glass sheet while allowing the glass sheet to flow in one direction in the lehr, and
   a cutting step of cutting the glass sheet that has been cooled, by the cutting device,
   the furnace outside space including a forming furnace outside space that includes a region corresponding to a position where the forming furnace is disposed, and a lehr outside space that includes a region corresponding to a position where the lehr and cutting device are disposed,
   in the air pressure controlling step, the air pressure control being carried out such that a temperature of an outer surface of the furnace wall covering the whole furnace is stabilized by an air pressure of the forming furnace outside space being higher than an air pressure of the lehr outside space, wherein the air pressure of the lehr outside space is higher than atmospheric pressure.

2. The method for producing a glass sheet according to claim 1, wherein
   in the air pressure controlling step, the air pressure control is carried out such that the air pressure is higher at a position more toward an upstream side in a flow direction of the glass sheet inside the furnace outside space.

3. The method for producing a glass sheet according to claim 1, wherein
   the furnace outside space further includes a lower space located below an upper space including the forming furnace outside space and the lehr outside space, and
   in the air pressure controlling step, the air pressure control is carried out such that an air pressure of the lower space is equal to or higher than atmospheric pressure.

4. The method for producing a glass sheet according to claim 1, wherein
   a difference between air pressures of the forming furnace outside space and the lehr outside space satisfies a following formula (1):

0<(Air pressure of the forming furnace outside space−Air pressure of the lehr outside space) <20 [Pa]   (1).

5. The method for producing a glass sheet according to claim 1, wherein
   the glass sheet has a length in a width direction of 2000 mm or greater.

6. The method for producing a glass sheet according to claim 1, wherein
   the forming step includes a step of more rapidly cooling opposite ends in a width direction of the glass sheet than a central part in the width direction of the glass sheet, to obtain glass viscosity η in units of Poise at the opposite ends satisfying log η=9 to 14.5.

7. The method for producing a glass sheet according to claim 1, wherein
   in the annealing step,
   at least in a temperature range from a temperature of a glass annealing point of the glass sheet plus 150° C. to a temperature of a glass strain point of the glass sheet minus 200° C.,
   a rate of cooling a central part in a width direction of the glass sheet is higher than a rate of cooling the opposite ends, and
   the glass sheet is shifted from a state in which a temperature of the central part in the width direction of the glass sheet is higher than a temperature of the opposite ends to a state in which the temperature of the central part is lower than the temperature of the opposite ends,
   such that tensile stress acts in the direction of flow of the glass sheet on the central part in the width direction of the glass sheet.

8. The method for producing a glass sheet according to claim 1, wherein
   in the annealing step,
   an above-glass-strain-point temperature controlling step is carried out that is a step of carrying out, from a lower part of the forming cell, temperature control of the glass sheet in a width direction in a temperature range extending to a temperature lower than a temperature range in a vicinity of a glass strain point, and
   the above-glass-strain-point temperature controlling step includes:
     a step of controlling a temperature of opposite ends in the width direction of the glass sheet so as to be lower than a temperature of a central region sandwiched between the opposite ends, and controlling the temperature of the central region so as to be uniform;
     a step of controlling a temperature distribution in the width direction of the glass sheet such that the temperature decreases toward the opposite ends from the central part; and
     a step of controlling temperature such that there is no temperature gradient between the central part and the opposite ends in the temperature range in the vicinity of the glass strain point.

9. The method for producing a glass sheet according to claim 8, wherein
   in the step of carrying out the temperature control on the glass sheet in the width direction,
   a below-glass-strain-point temperature control step is further carried out that includes a step of controlling the temperature from the opposite ends in the width direction of the glass sheet to the central part in the width direction of the glass sheet so as to be uniform in a temperature range in the vicinity of the glass strain point of the glass sheet, and a step of allowing the temperature of the glass sheet that has become uniform to be lower from the opposite ends to the central part to decrease the temperature toward the central part from the opposite ends.

10. The method for producing a glass sheet according to claim 1, wherein
    the annealing step includes:
      a first cooling step of cooling the glass sheet at a first average cooling rate until a temperature of a central part in a width direction of the glass sheet reaches a glass annealing point of the glass sheet, a second cooling step of cooling the glass sheet at a second average cooling rate until the temperature of the central part reaches a glass strain point minus 50° C. from the glass annealing point, and a third cooling step of cooling the glass sheet at a third average cooling rate until the temperature of the central part reaches a glass strain point minus 200° C. from the glass strain point minus 50° C., and the first average cooling rate is 5.0° C./second or higher, the first average cooling rate is higher than the third average cooling rate, and the third average cooling rate is higher than the second average cooling rate.

11. The method for producing a glass sheet according to claim 1, wherein the glass sheet has a total SrO and BaO content of less than 8 mass % and a glass strain point of 675° C. or higher, and in the annealing step, an average cooling rate from a glass annealing point of the glass sheet to a temperature of glass strain point minus 50° C. is less than 0.5 to 5.5° C./second.

12. The method for producing a glass sheet according to claim 1, wherein in the annealing step, so as not to generate plastic deformation in an adjacent region that is adjacent to a portion sandwiched between rollers used to draw the glass sheet and that is on an inner side of the portion in a width direction of the glass sheet, in a portion of the glass sheet where a temperature range of the adjacent region is between a glass transition point and a glass softening point of the glass sheet, tensile stress is allowed to act on the glass sheet in a direction in which the glass sheet flows.

13. The method for producing a glass sheet according to claim 1, wherein in the annealing step, drives of rollers that draw down the glass sheet are controlled such that a peripheral speed of rollers disposed on a downstream side, in a flow direction of the glass sheet, of a temperature range in which a temperature of the glass sheet is at a glass annealing point, is equal to or greater than a peripheral speed of rollers disposed in a temperature range in which a temperature of the glass sheet is equal to or higher than a glass transition point and equal to or lower than a glass softening point.

14. The method for producing a glass sheet according to claim 1, wherein the lehr outside space is separated from the forming furnace outside space by a partition, and the air pressure control is carried out such that an air pressure of the lehr outside space is lower than an air pressure of a furnace inside space surrounding the lehr in the furnace, at an identical height position.

15. The method for producing a glass sheet according to claim 1, wherein the furnace outside space further includes a lower space located below the lehr outside space, and in the air pressure controlling step, the air pressure control is carried out such that an air pressure of the lehr outside space is higher than an air pressure of the lower space by a pressure difference greater than 2 [Pa] and less than 20 [Pa].

16. The method for producing a glass sheet according to claim 1, wherein the forming furnace outside space includes an upper forming furnace outside space and a lower forming furnace outside space, both of which are separated from each other by a partition, and in the air pressure controlling step, the air pressure control is carried out such that an air pressure of the lower forming furnace outside space is higher than an air pressure of the lehr outside space by a pressure difference greater than 2 [Pa ]and less than 20 [Pa].

17. The method for producing a glass sheet according to claim 1, wherein the forming furnace outside space includes an upper forming furnace outside space and a lower forming furnace outside space, both of which are separated from each other by a partition, and in the air pressure controlling step, the air pressure control is carried out such that an air pressure of the upper forming furnace outside space is higher than an air pressure of the lower forming furnace outside space by a pressure difference greater than 2 [Pa ]and less than 15 [Pa].

18. The method for producing a glass sheet according to claim 1, wherein a difference between air pressure of the lower lehr outside space and atmospheric pressure satisfies a following formula (2):

$$5 \text{ [Pa]} < (\text{Air pressure of lower lehr outside space} - \text{atmospheric pressure}) < 40 \text{ [Pa]} \qquad (2).$$

* * * * *